US009262537B2

(12) United States Patent
Kim et al.

(10) Patent No.: US 9,262,537 B2
(45) Date of Patent: Feb. 16, 2016

(54) SYSTEMS AND METHODS FOR DYNAMICALLY DETERMINING INFLUENCERS IN A SOCIAL DATA NETWORK USING WEIGHTED ANALYSIS

(71) Applicant: Sysomos L.P., Toronto (CA)

(72) Inventors: Edward Dong-Jin Kim, Toronto (CA); Brian Jia-Lee Keng, Thornhill (CA); Kanchana Padmanabhan, Toronto (CA)

(73) Assignee: SYSOMOS L.P., Toronto (CA)

( * ) Notice: Subject to any disclaimer, the term of this patent is extended or adjusted under 35 U.S.C. 154(b) by 0 days.

(21) Appl. No.: 14/522,357

(22) Filed: Oct. 23, 2014

(65) Prior Publication Data
US 2015/0120721 A1 Apr. 30, 2015

Related U.S. Application Data

(60) Provisional application No. 61/895,539, filed on Oct. 25, 2013, provisional application No. 61/907,878, filed on Nov. 22, 2013, provisional application No. 62/020,833, filed on Jul. 3, 2014.

(51) Int. Cl.
G06F 7/00 (2006.01)
G06F 17/30 (2006.01)
H04L 29/08 (2006.01)
G06Q 50/00 (2012.01)

(52) U.S. Cl.
CPC ...... *G06F 17/30867* (2013.01); *G06F 17/3053* (2013.01); *G06F 17/30554* (2013.01); *G06F 17/30958* (2013.01); *G06Q 50/01* (2013.01); *H04L 67/10* (2013.01)

(58) Field of Classification Search
CPC .................................................. G06F 17/30958
See application file for complete search history.

(56) References Cited

U.S. PATENT DOCUMENTS

| 8,312,056 | B1 | 11/2012 | Peng et al. |
| 2008/0162260 | A1 | 7/2008 | Rohan et al. |
| 2009/0119173 | A1 | 5/2009 | Parsons et al. |
| 2009/0132652 | A1 | 5/2009 | Athale |
| 2009/0276389 | A1 | 11/2009 | Constantine et al. |
| 2009/0307057 | A1 | 12/2009 | Azout et al. |

(Continued)

OTHER PUBLICATIONS

Loureiro et al; "Outlier Detection Using Clustering Methods: a data cleaning application"; 2004.

(Continued)

*Primary Examiner* — Ajith Jacob
(74) *Attorney, Agent, or Firm* — Blake, Cassels & Graydon LLP; Wilfred P. So

(57) ABSTRACT

System and methods performed by a server for determining weighted influence in social networks, including: determining posts related to the topic; characterizing each post as one or more of: a reply post, a mention post, and a re-posting; generating a group of user accounts comprising any user account that authored a posting to which is replied, being mentioned in the mention post, that posted content being re-posted, and/or that authored one or more posts that are related to the topic; representing each of the user accounts as a node in the group in a connected graph and establishing an edge between one or more pair of nodes when there is a follower-followee relationship between the nodes; and for each edge between nodes, determining a weighting that is a function of one or more of: a number of mention posts, a number of reply posts, and a number of re-posts.

20 Claims, 14 Drawing Sheets

(56) References Cited

U.S. PATENT DOCUMENTS

| | | | |
|---|---|---|---|
| 2009/0319518 A1 | 12/2009 | Kudos et al. |
| 2010/0057536 A1 | 3/2010 | Stefik et al. |
| 2012/0117059 A1 | 5/2012 | Bailey et al. |
| 2012/0324004 A1 | 12/2012 | Le et al. |
| 2013/0124437 A1 | 5/2013 | Pennacchiotti et al. |
| 2013/0212479 A1 | 8/2013 | Willis et al. |
| 2013/0218640 A1 | 8/2013 | Kidder et al. |
| 2013/0268595 A1 | 10/2013 | Mohan et al. |

OTHER PUBLICATIONS

Weng et al; TwitterRank: Finding Topic-Sensitive Influential Twiterers; Feb. 4, 2010.

Newman, M.E.J. (2006); "Modularity and community structure in networks"; Proceedings—National Academy of Sciences USA 103(23); 8577-8696.

Chidambaranthan, et al.; "Detection of Outlier-Communities using Minimum Spanning Tree"; Journal of Engineering Trends in Computing and Information Science; ISSN 2079-8407, pp. 608-614; Nov. 1, 2011.

Lau, Albert; International Search Report issued in related PCT Application No. PCT/CA2014/051033; search completed Nov. 24, 2014.

Lau, Albert; International Search Report issued in related PCT Application No. PCT/CA2014/051032; search completed Nov. 26, 2014.

Farr J. N., Jenkins J. J., Paterson D. G., Simplification of Flesch Reading Ease Formula, Journal of Applied Psychology) (1951).

Sahami, M.; Dumais S.; Heckerman D.; and Horvitz E.; "A Bayesian approach to filtering junk e-mail"; in AAAI-98 Workshop on Learning for Text Categorization, pp. 55-62, 1998.

Chakrabarti, Soumen; Kaufmann, Morgan; "Mining the Web: Discovering Knowledge from Hypertext Data"; 2003.

Fung, G. P. C. ; Yu, J. X.; Yu, P. S.; Lu, H.; "Parameter free bursty events detection in text streams"; In Proceedings of the 31st International Conference on Very Large Data Bases, Trondheim, Norway, pp. 181-192, 2005.

Fagin, R.; Kumar, R.; Sivakumar, D; "PODS: 23th ACM SIGACT-SIGMOD-SIGART Symposium on Principles of Database Systems"; 2004; Comparing top k lists. SIJDM: SIAM Journal on Discrete Mathematics, 17, 2003.

Manku, G. S.; Rajagopalan, S.; Lindsay, B. G.; "Approximate medians and other quantiles in one pass and with limited memory"; In Proceedings of the ACM SIGMOD International Conference on Management of Data, New York, 1998.

Church, K. W.; Hanks, P. ; "Word Association Norms"; Mutual Information and Lexicography. In ACL, 1989.

Gyongyi, Z.; Garcia-Molina, H.; Petersen, J.; "Combating Web Spam with TrustRank"; In VLDB, 2004; Haveliwala, T. Topic-Sensitive PageRank. In WWW, 2002.

Chandel, A.; Hassanzadeh, O.; Koudas, N.; Sadoghi, M.; Srivastava., D.; "Benchmarking Declarative Approximate Selection Predicates"; In SIGMOD, 2007.

Crestani, F.; "Application of Spreading Activation Techniques in Information Retrieval"; In Artificial Intelligence Review, 1997.

Feller, W.; "An Introduction to Probability Theory and Its Applications"; Wiley, 1968.

Manning, Christopher D; Schücutze, Hinrich; "Foundations of Statistical Natural Language Processing"; MIT Press 2000.

Page, Lawrence; Brin, Sergey; Motwani, Rajeev and Winograd, Terry; The PageRank citation ranking; Bringing Order to the Web; 1999.

Gephi, an open-source network analysis and visualization software package. www.gephi.org.

Kim, E.D.; Keng, B.; Contextual Influencer Graphs on Social Networks; Technical white paper (Sysomos blog).

Blondel, V.D.; Guillaume, J.-L.; Lambiotte, R. and Lefebvre, E.; Fast unfolding of community hierarchies in large networks; J-Stat. Mech. 2008 (10): P1008.doi:10.1088/1742-5468/2008/10/P1008.

Kim, E.D.; Keng, B.; Influencer Communities; Technical white paper (Sysomos blog).

D3 (Data-Driven Documents); Javascript Library; www.d3js.org; retrieved from the Internet Mar. 3, 2015.

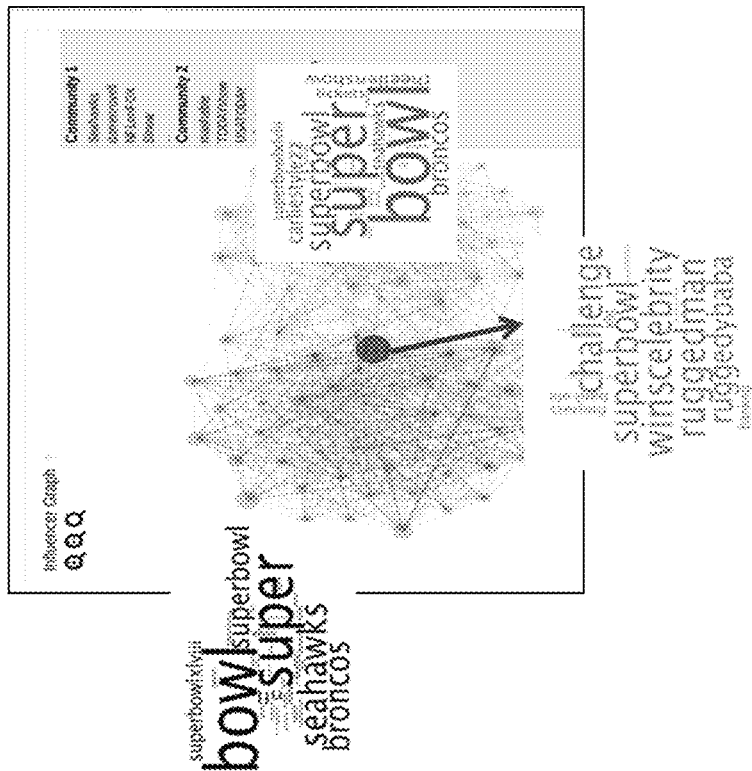
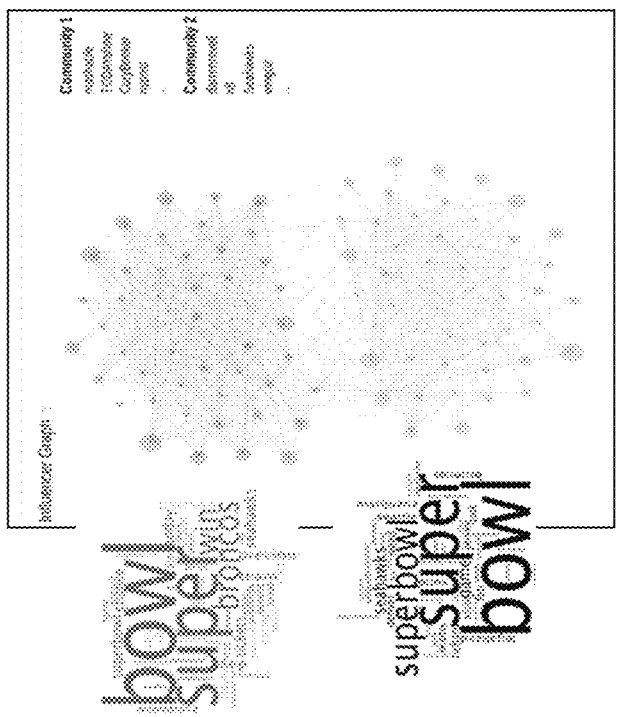
Fig. 15 (A)
Fig. 15 (B)

SYSTEMS AND METHODS FOR DYNAMICALLY DETERMINING INFLUENCERS IN A SOCIAL DATA NETWORK USING WEIGHTED ANALYSIS

CROSS-REFERENCE TO RELATED APPLICATIONS

This application claims priority to U.S. Provisional Patent Application No. 61/895,539 filed on Oct. 25, 2013, titled "Systems and Methods for Determining Influencers in a Social Data Network", and U.S. Provisional Patent Application No. 61/907,878 filed on Nov. 22, 2013, titled "Systems and Methods for Identifying Influencers and Their Communities in a Social Data Network", and U.S. Provisional Patent Application No. 62/020,833 filed on Jul. 3, 2014, titled "Systems and Methods for Dynamically Determining Influencers in a Social Data Network Using Weighted Analysis" and the entire contents of which are incorporated herein by reference.

TECHNICAL FIELD

The following generally relates to analysing social network data.

BACKGROUND

In recent years social media has become a popular way for individuals and consumers to interact online (e.g. on the Internet). Social media also affects the way businesses aim to interact with their customers, fans, and potential customers online.

Some bloggers on particular topics with a wide following are identified and are used to endorse or sponsor specific products. For example, advertisement space on a popular blogger's website is used to advertise related products and services.

Social network platforms are also used to influence groups of people. Examples of social network platforms include those known by the trade names Facebook, Twitter, LinkedIn, Tumblr, and Pinterest. Popular or expert individuals within a social network platform can be used to market to other people. Quickly identifying popular or influential individuals becomes more difficult when the number of users within a social network grows. Furthermore, accurately identifying influential individuals within a particular topic is difficult. The experts or those users who are popular in a social network are herein interchangeably referred to as "influencers".

BRIEF DESCRIPTION OF THE DRAWINGS

Embodiments will now be described by way of example only with reference to the appended drawings wherein:

FIG. 13A shows results that does not use weighted analysis and FIG. 13B shows results using weighted analysis.

FIGS. 15A and 15B illustrate exemplary screen shots for interacting with a GUI displaying the influencer communities within a topic network, where FIG. 15A shows results that does not use weighted analysis and FIG. 15B shows results using weighted analysis.

DETAILED DESCRIPTION OF THE DRAWINGS

Figure 1:
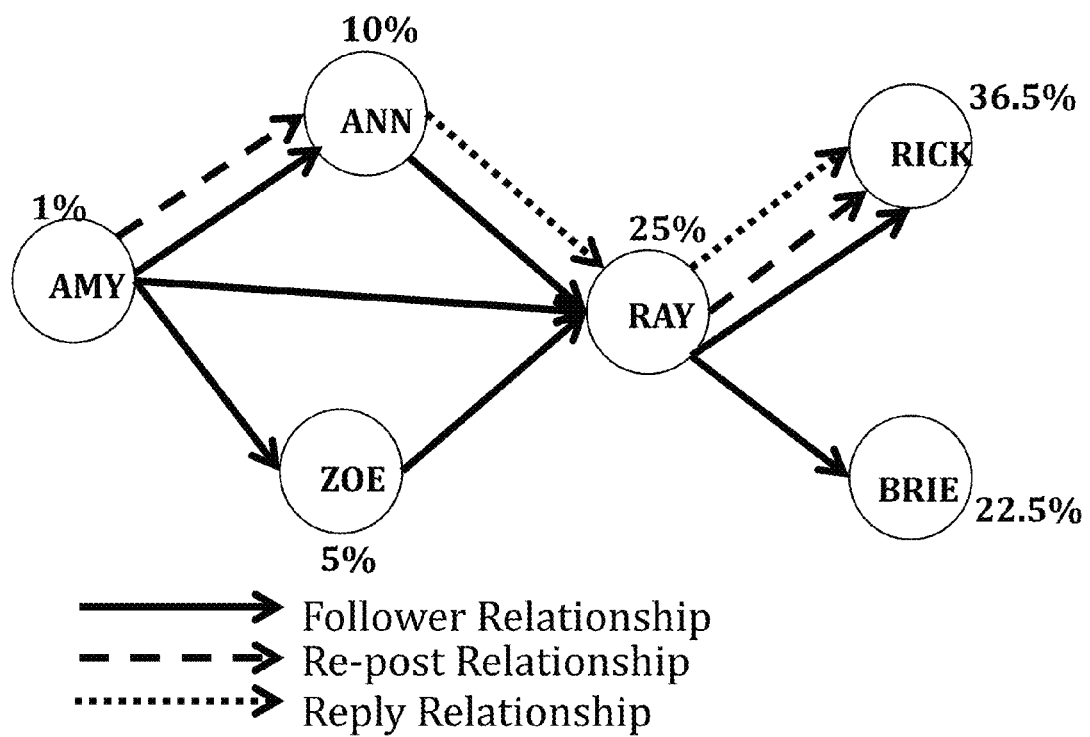
FIG. 1 is a diagram illustrating users in connection with each other in a social data network.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Social networking platforms include users who generate and post content for others to see, hear, etc (e.g. via a network of computing devices communicating through websites associated with the social networking platform). Non-limiting examples of social networking platforms are Facebook, Twitter, LinkedIn, Pinterest, Tumblr, blogospheres, websites, collaborative wikis, online newsgroups, online forums, emails, and instant messaging services. Currently known and future known social networking platforms may be used with principles described herein. Social networking platforms can be used to market to, and advertise to, users of the platforms. It is recognized that it is difficult to identify users relevant to a given topic. This includes identifying influential users on a given topic.

It also recognized that social networks offer enormous potential for brands and companies to get their message across to the brand's influencers. Influencers are people interested in the brand and their opinions matter to a large number of people in the social network. When the right influencers are found they can broadcast, endorse, or even champion the brand's message.

Social networks allow influencers to easily pass on information to all their followers (e.g., re-tweet or @reply using Twitter) or friends (e.g., share using Facebook). However, the obvious caveat lies in identifying the right influencers. Some graph analytic methodologies use a keyword query to identify influencers who generate content (e.g., tweets or posts) referring to a brand, in a given time frame. The method considers the follower-following (or friend) relationship among the individuals and also identifies groupings among these individuals. The groupings allow a brand to send customize messages to different audiences. However, not all followers (or friends) will value and spread an individual's opinion on a brand. Understanding the significance or characterization of a follower and followee relationship is difficult for computers based on typical data measurements.

It also herein recognized that when all the links in the network are treated equal, such an approach fails to capture an important aspect of human psyche. People's "trust" tends to change over time. For example, while Amy follows Ann and Zoe (see FIG. 1), Amy chooses to re-post posts from Ann in the given timeframe and could re-post posts from Zoe sometime in the future. Thus, all links in the network are not equally important in spite of representing the same relationship.

The term "post" or "posting" refers to content that is shared with others via social data networking. A post or posting may be transmitted by submitting content on to a server or website or network for other to access. A post or posting may also be transmitted as a message between two devices. A post or posting includes sending a message, an email, placing a comment on a website, placing content on a blog, posting content on a video sharing network, and placing content on a networking application. Forms of posts include text, images, video, audio and combinations thereof.

As used herein, the term "influencer" refers to a user account that primarily produces and shares content related to a topic and is considered to be influential to other users in the social data network. More particularly, an influencer is an individual or entity represented in the social data network that: is considered to be interested in the topic or generate content about the topic; has a large number of followers (e.g. or readers, friends or subscribers), a significant percent of which are interested in the topic; and has a significant percentage of the topic-interested followers that value the influencer's opinion about the topic. Non-limiting examples of a topic include a brand, a company, a product, an event, a location, and a person.

The term "follower", as used herein, refers to a first user account (e.g. the first user account associated with one or more social networking platforms accessed via a computing device) that follows a second user account (e.g. the second user account associated with at least one of the social networking platforms of the first user account and accessed via a computing device), such that content posted by the second user account is published for the first user account to read, consume, etc. For example, when a first user follows a second user, the first user (i.e. the follower) will receive content posted by the second user. A user with an "interest" on a particular topic herein refers to a user account that follows a number of experts (e.g. associated with the social networking platform) in the particular topic. In some cases, a follower engages with the content posted by the other user (e.g. by sharing or reposting the content).

Identifying the key influencers is desirable for companies in order, for example, to target individuals who can potentially broadcast and endorse a brand's message. Engaging these individuals allows control over a brand's online message and may reduce the potential negative sentiment that may occur. Careful management of this process may lead to exponential growth in online mindshare, for example, in the case of viral marketing campaigns.

Most past approaches to determining influencers have focused on easily calculable metrics such as the number of followers or friends, or the number of posts. While the aggregated followers or friends count may approximate the overall social network, it provides little data in the way of computing metrics that indicate the influence of a user or individual with respect to a company or brand. This leads to noisy influencer results and wasted time sifting through the massive volume of potential users.

Several social media analytics companies claim to provide influencer scores for social networks. However, it is herein recognized that many companies use a metric that is not a true influencer metric, but an algebraic formula of the number of followers and the number of mentions (e.g. "tweets" for Twitter, posts, messages, etc.). For instance, some of the known approaches use a logarithmic normalization of these numbers that allocates approximately 80% of the weight to the follower counts and the remainder to the number of mentions.

The reason for using an algebraic formula is that the counting or tallying of followers and mentions are instantly updated in the user profile for a social network. Hence, the computation is very fast and easy to report. This is often called an Authority metric or Authority score to distinguish it from true influencer analysis.

In an example embodiment, the Authority score, for example, is computed using a linear combination of several parameters, including the number of posts from a user and the number followers that follow the same user. In an example embodiment, the linear combination may also be based on the number of ancillary users that the same user follows.

However, there are several significant drawbacks to the Authority score approach. It is herein recognized that this Authority score is context insensitive. This is a static metric irrespective of the topic or query. For example, regardless of the topic, mass media outlets like the New York Times or CNN would get the highest ranking since they have millions of followers. Therefore, it is not context-sensitive.

It is also herein recognized that this Authority metric has a high follower count bias. If there is a well-defined specialist in a certain field with a limited number of followers, but all of them are also experts, they will never show up in the top 20 to 100 results due to their low follower count. Effectively, all the followers are treated as having equal weight, which has been shown to be an incorrect assumption in network analytics research.

The proposed systems and methods, as described herein, may dynamically calculate influencers with respect to the query topic, and may account for the influence of their followers.

It is also recognized that the recursive nature of the influencer relation is a challenge in implementing influencer identification on a massive scale. By way of example, consider a situation where there are individuals A, B and C with: A following B and C; B following C and A; and C following only A. Then the influence of A is dependent on C, which in turn is dependent on A and B, and so on. In this way, the influencer relationships have a recursive nature.

More generally, the proposed systems and methods provide a way to determine the influencers in a social data network. In the proposed example systems and methods, weighted edges or connections, are used to develop a network graph and several different types of edges or connections are considered between different user nodes (e.g. user accounts) in a social data network. These types of edges or connections include: (a) a follower relationship in which a user follows another user; (b) a re-post relationship in which a user re-sends or re-posts the same content from another user; (c) a reply relationship in which a user replies to content posted or sent by another user; and (d) a mention relationship in which a user mentions another user in a posting.

In a non-limiting example of a social network under the trade name Twitter, the relationships are as follows:

Re-tweet (RT): Occurs when one user shares the tweet of another user. Denoted by "RT" followed by a space, followed by the symbol @, and followed by the Twitter user handle, e.g., "RT @ABC followed by a tweet from ABC).

@Reply: Occurs when a user explicitly replies to a tweet by another user. Denoted by '@' sign followed by the Twitter user handle, e.g., @username and then follow with any message.

@Mention: Occurs when one user includes another user's handle in a tweet without meaning to explicitly reply. A user includes an @ followed by some Twitter user handle somewhere in his/her tweet, e.g., Hi @XYZ let's party @DEF @TUV These relationships denote an explicit interest from the source user handle towards the target user handle. The source is the user handle who re-tweets or @replies or @mentions and the target is the user handle included in the message.

In the example of using weighted edges to identify top influencers and their communities, the network links are weighted to create a notion of link importance and further, external sources are identified and incorporated into the social data network. Examples of external sources include users and their activities of re-posting an old message or content posting, or users and their activities of referencing or mention an old message or content posting. Another example of an external source is a user and their activity of mentioning a topic in a social data network, but the topic originates from another or ancillary social data network.

As an example, consider the simplified follower network for a particular topic in FIG. 1. FIG. 1 depicts a social network with several kinds of links: a follower-following relationship; a re-post relationship, and another is a reply relationship. The mention relationship is applicable, although it is not shown in the particular example of FIG. 1. It is shown that Ray is fairly influential since he has the largest number of followers in the network. However, Rick and Brie also have significant influence as Ray follows them both. Between Rick and Brie, Rick is likely a stronger influencer since Ray has also re-posted and replied to Rick's posts (e.g. tweets or messages). In the given network, the influencers are likely Rick and Ray.

As seen in FIG. 1, taking into consideration the re-post and the reply relationships (or share) along with the follower (or friend) information provides a more accurate picture of the true influencers and also improves the groups identified.

It can be appreciated that the nodes in the graph represent different user accounts, such a user account for Ray and another user account for Rick. The direction of the arrows is also used to indicate who is the prime user (e.g. author, originator, person or account being mentioned by another, followee, etc.) and who is the secondary user (e.g. re-poster, follower, replier, person who does the mentioning, etc.). For example, the arrow head represents the prime user and the tail of the arrow represents the secondary user.

Beside each user account in FIG. 1, a PageRank score is provided. The PageRank algorithm is a known algorithm used by Google to measure the importance of website pages in a network and can be also applied to measuring the importance of users in a social data network.

The intuition is that, if a few experts consider someone an expert, then s/he is also an expert. However, the PageRank algorithm gives a better measure of influence than only counting the number of followers. As will be described below, the PageRank algorithm and other similar ranking algorithms can be used with the proposed systems and methods described herein.

The proposed systems and method also recognize that influencers may come from external sources. The notion of "external" sources may take two forms. First, even though an influencer may not have tweeted recently on a given topic, Twitter-sphere may continue to mention her or retweet one of her old posts, given her influence on this topic. For example, a sports expert may share his/her opinion on the Super Bowl and that opinion gets talked about for months after the actual game.

Second, individuals often converse about topics that originate from sources entirely outside of the network. For example, videos hosted on YouTube may be tweeted. In both cases the proposed systems and methods aim to capture the video/opinion sources as influencers.

In a general example embodiment, a weighted network analysis methodology is provided to identify communities and their top influencers by (1) weighting the network links to create a notion of "link importance" and (2) identifying and incorporating some key "external" sources into the network. Additionally, an aggregated list of the top influencers across all communities is provided, which is used to help determine a relative order of all the influencers. The visualization of the communities and the influencers allow end-users to understand the scale and relative significance of each of the influencers and their interconnections in their communities.

Figure 2:
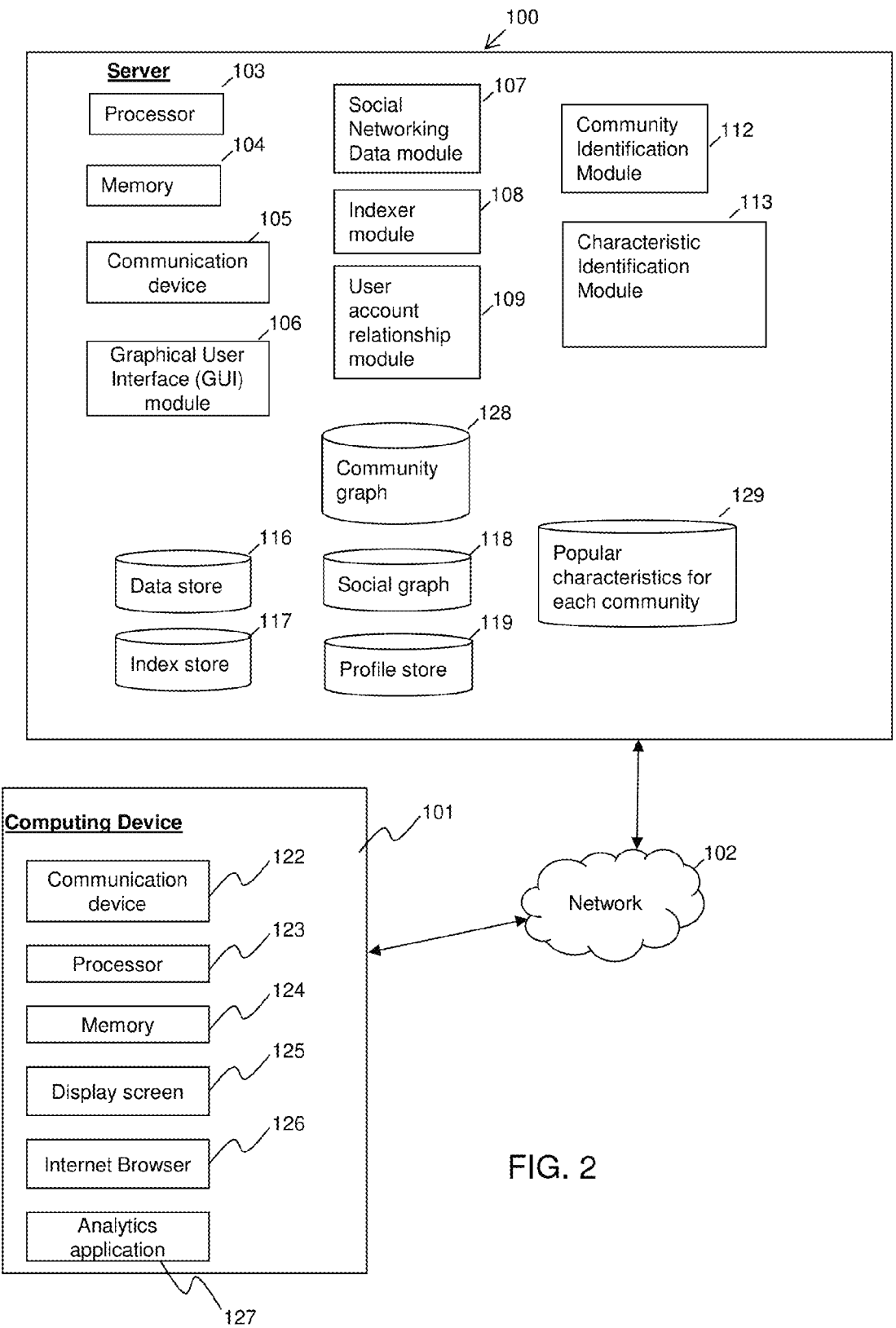
FIG. 2 is a schematic diagram of a server in communication with a computing device.

Turning to FIG. 2, a schematic diagram of a proposed system is shown. A server 100 is in communication with a computing device 101 over a network 102. The server 100 obtains and analyzes social network data and provides results to the computing device 101 over the network. The computing device 101 can receive user inputs through a GUI to control parameters for the analysis.

It can be appreciated that social network data includes data about the users of the social network platform, as well as the content generated or organized, or both, by the users. Non-limiting examples of social network data includes the user account ID or user name, a description of the user or user account, the messages or other data posted by the user, connections between the user and other users, location information, etc. An example of connections is a "user list", also herein called "list", which includes a name of the list, a description of the list, and one or more other users which the given user follows. The user list is, for example, created by the given user.

Continuing with FIG. 2, the server 100 includes a processor 103 and a memory device 104. In an example embodiment, the server includes one or more processors and a large amount of memory capacity. In another example embodiment, the memory device 104 or memory devices are solid state drives for increased read/write performance. In another example embodiment, multiple servers are used to implement the methods described herein. In other words, in an example embodiment, the server 100 refers to a server system. In another example embodiment, other currently known computing hardware or future known computing hardware is used, or both.

The server 100 also includes a communication device 105 to communicate via the network 102. The network 102 may be a wired or wireless network, or both. The server 100 also includes a GUI module 106 for displaying and receiving data via the computing device 101. The server also includes: a social networking data module 107; an indexer module 108; a user account relationship module 109; a community identification module 112 and a characteristic identification module 113. As will be described, the community identification module 112 is configured to define communities or cluster of data based on a network graph.

The server 100 also includes a number of databases, including a data store 116, an index store 117, a database for a social graph 118, a profile store 119, a database for storing community graph information 128, and a database for storing popular characteristics for each community 129 and storing pre-defined characteristics to be searched within each community, the communities as defined by community identification module 112.

The social networking data module 107 is used to receive a stream of social networking data. In an example embodiment, millions of new messages are delivered to social networking data module 107 each day, and in real-time. The social networking data received by the social networking data module 107 is stored in the data store 116.

The indexer module 108 performs an indexer process on the data in the data store 116 and stores the indexed data in the index store 117. In an example embodiment, the indexed data in the index store 117 can be more easily searched, and the identifiers in the index store can be used to retrieve the actual data (e.g. full messages).

A social graph is also obtained from the social networking platform server, not shown, and is stored in the social graph database 118. The social graph, when given a user as an input to a query, can be used to return all users following the queried user.

The profile store 119 stores meta data related to user profiles. Examples of profile related meta data include the aggregate number of followers of a given user, self-disclosed personal information of the given user, location information of the given user, etc. The data in the profile store 119 can be queried.

In an example embodiment, the user account relationship module 109 can use the social graph 118 and the profile store 119 to determine which users are following a particular user. The module 109 is also configured to determine relationships between user accounts, including reply relationships, mention relationships, and re-post relationships.

Referring again to FIG. 2, the server 100 further comprises a community identification module 112 that is configured to identify communities (e.g. a cluster of information within a queried topic such as Topic A) within a topic network and associated influencer. As will be described with reference to FIG. 3, the topic network illustrates the graph of influential users and their relationships (e.g. as defined by the social graph 118). The output from a community identification module 112 comprises a visual identification of clusters (e.g. color coded) defined as communities of the topic network that contain common characteristics and/or are affected (e.g. influenced such as follower-followee relationships), to a higher degree by other entities (e.g. influencers) in the same community than those in another community. The server 100 further comprises a characteristic identification module 113.

The characteristic identification module 113 is configured to receive the identified communities from the community identification module 112 and provide an identification of popular characteristics (e.g. topic of conversation) among the community members. The results of the characteristic identification module 113, can be visually linked to the corresponding visualization of the community as provided in the community identification module 112. As will be described, in one aspect, the results of the community identification module 112 (e.g. a plurality of communities) and/or characteristic identification module 113 (e.g. a plurality of popular characteristics within each community) are displayed on the display screen 125 as output to the computing device 101. In yet a further aspect, the GUI module 106 is configured to receive input from the computing device 101 for selection of a particular community as identified by the community identification module 112. The GUI module 106 is then configured to communicate with the characteristic identification module 113, to provide an output of results for a particular characteristic (e.g. defining popular conversations) as associated with the selected community (e.g. for all influential users within the selected community). The results of the characteristic identification module 112 (e.g. a word cloud to visually define popular conversations among users of the selected community) can be displayed on the display screen 125 alongside the particular selected community and/or a listing of users within the particular selected community.

Continuing with FIG. 2, the computing device 101 includes a communication device 122 to communicate with the server 100 via the network 102, a processor 123, a memory device 124, a display screen 125, and an Internet browser 126. In an example embodiment, the GUI provided by the server 100 is displayed by the computing device 101 through the Internet browser. In another example embodiment, where an analytics application 127 is available on the computing device 101, the GUI is displayed by the computing device through the analytics application 127. It can be appreciated that the display device 125 may be part of the computing device (e.g. as with a mobile device, a tablet, a laptop, etc.) or may be separate from the computing device (e.g. as with a desktop computer, or the like).

Although not shown, various user input devices (e.g. touch screen, roller ball, optical mouse, buttons, keyboard, microphone, etc.) can be used to facilitate interaction between the user and the computing device 101.

It will be appreciated that, in another example embodiment, the system includes multiple servers. In another example embodiment, there are multiple computing devices that communicate with the one or more servers.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server 100 or computing device 101 or accessible or connectable thereto. Any application or module herein described may be implemented using computer readable/executable instructions that may be stored or otherwise held by such computer readable media.

Figure 3:
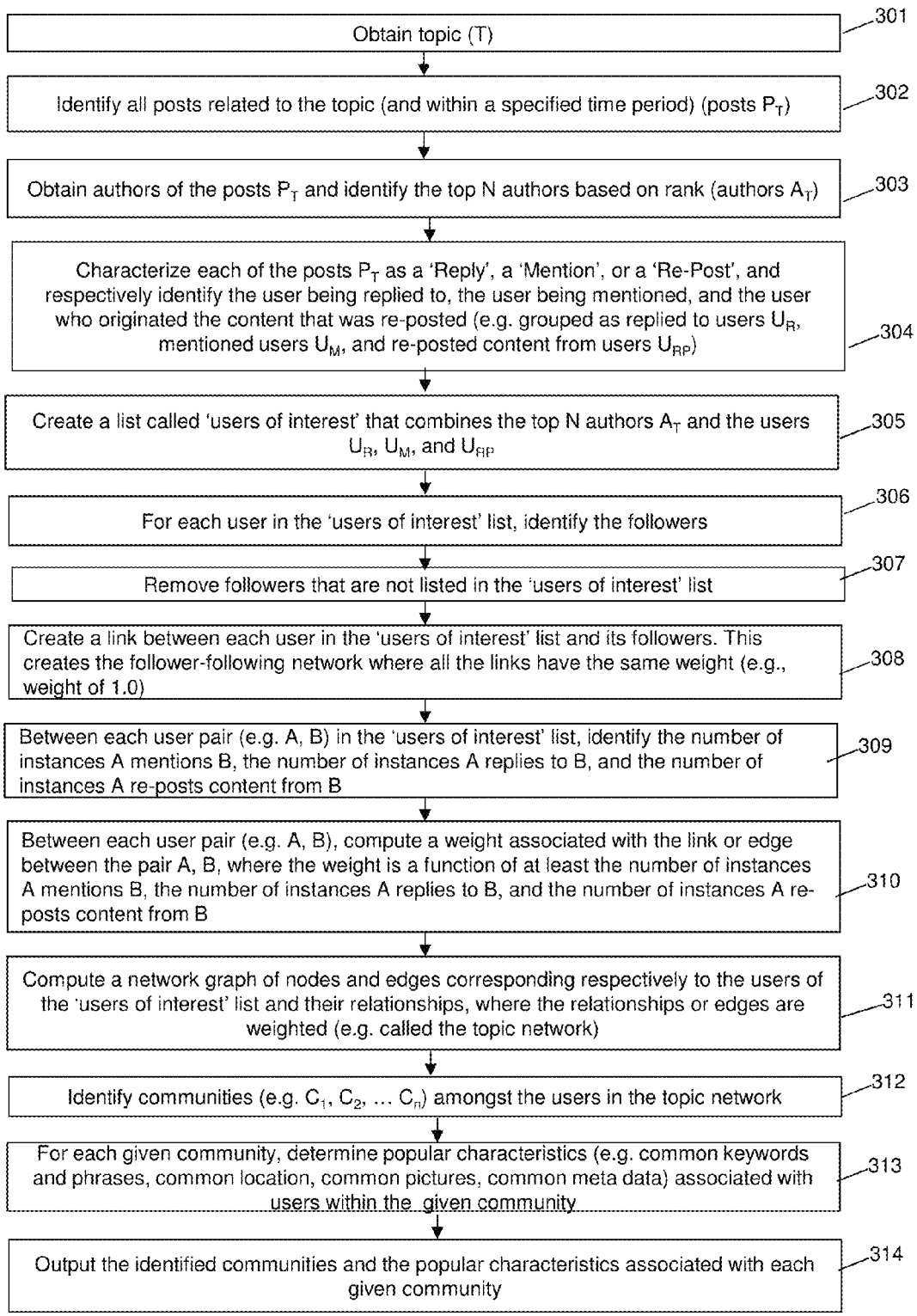
FIG. 3 is a flow diagram of an example embodiment of computer executable instructions for determining weighted relationships between users for a given topic, and communities of influencers based on the weighted relationships.

Turning to FIG. 3, an example embodiment of computer executable instructions are shown for determining one or more influencers of a given topic. The process shown in FIG. 3 assumes that social network data is available to the server 100, and the social network data includes multiple users. At block 301, the server 100 obtains a topic represented as T. For example, a user may enter in a topic via a GUI displayed at the computing device 101, and the computing device 101 sends the topic to the server 100. At block 302, the server uses the topic to identify all posts related to the topic. These set of posts are collectively denoted as $P_T$. In an example embodiment, one or more additional search criteria are used, such as a specified time period. In other words, the server may only be examining posts related to the topic within a given period of time. Finding posts related to a certain topic can be implemented in various ways and will be discussed in further detail below.

Continuing with FIG. 3, the server obtains authors of the posts $P_T$ and identifies the top N authors based on rank (block 303). The set of top ranked authors is represented by $A_T$. In an example embodiment, the top N authors are identified using the Authority Score. Other methods and processes may be used to rank the authors. For example, the server uses PageRank to measure importance of a user within the topic network and to rank the user based on the measure. Other non-limiting examples of ranking algorithms that can be used include: Eigenvector Centrality, Weighted Degree, Betweenness, Hub and Authority metrics.

It is appreciated that the authors are uses in the social network that authored the posts. It is also appreciated that N is a counting number. Non-limiting example values of N include those values in the range of 3,000 to 5,000. Other values of N can be used.

At block 304, the server characterizes each of the posts $P_T$ as a 'Reply', a Mention', or a 'Re-Post', and respectively identifies the user being replied to, the user being mentioned, and the user who originated the content that was re-posted (e.g. grouped as replied to users $U_R$, mentioned users $U_M$, and re-posted content from users $U_{RP}$). The time stamp of each reply, mention, re-post, etc. may also be recorded in order to determine whether an interaction between users is recent, or to determine a 'recent' grading.

At block 305, the server generates a list called 'users of interest' that combines the top N authors $A_T$ and the users $U_R$, $U_M$, and $U_{RP}$. Non-limiting examples of the numbers of users in the 'users of interest' list or group include those numbers in range of 3,000 to 10,000. It will be appreciated that the number of users in the 'users of interest' group or list may be other values.

For each user in the 'users of interest' list, the server identifies the followers of each user (block 306). At block 307, the server removes the followers that are not listed in the 'users of interest' list, while still having identified the follower relationships between those users that are part of the 'users of interest'.

In a non-limiting example implementation of block 306, it was found that there were several million follower connections or edges when considering all the followers associated with the 'users of interest'. Considering all of these follower edges may be computationally consuming and may not reveal influential interactions. To reduce the number of follower edges, those followers that are not part of the 'users of interest' are discarded as per block 307.

In an alternative embodiment of blocks 306 and 307, the server identifies the follower relationships limited to only users listed in the 'users of interest' group.

At block 308, the server creates a link between each user in the 'users of interest' list and its followers. This creates the follower-following network where all the links have the same weight (e.g., weight of 1.0).

At block 309, between each user pair (e.g. A, B) in the 'users of interest' list, the server identifies the number of instances A mentions B, the number of instances A replies to B, and the number of instances A re-posts content from B. It can be appreciated that a user pair does not have to have a follower-followee relationship. For example, a user A may not follow a user B, but a user A may mention user B, or may re-post content from user B, or may reply to a posting from user B. Thus, there may be an edge or link between a user pair (A,B), even if one is not a follower of the other.

Furthermore, at block 310, between each user pair (e.g. A, B), the server computes a weight associated with the link or edge between the pair A, B, where the weight is a function of at least the number of instances A mentions B, the number of instances A replies to B, and the number of instances A re-posts content from B. For example, the higher the number of instances, the higher the weighting.

In an example embodiment, at block 308, the weighting of an edge is initialized at a first value (e.g. value of 1.0) when there is a follower-followee link and otherwise the edge is initialized at a second value (e.g. value of 0) where there is no follower-followee link, where the second value is less than the first value. Each additional activity (e.g. reply, repost, mention) between two users will increase the edge weight to a maximum weighting value of 4.0. Other numbers or ranges can be used to represent the weighting.

In an example embodiment, the relationship between the increasing number of activity or instances and the increasing weighting is characterized by an exponentially declining scale. For example, consider a user pair A,B, where A follows B. If there are 2 re-posts, the weighting is 2.0. If there are 20 re-posts, the weighting is 3.9. If there are 400 re-posts, the weighting is 4.0. It is appreciated that these numbers are just for example and that different numbers and ranges can be used.

In an example embodiment, the weighting is also based on how recent did the interaction (e.g. the re-post, the mention, the reply, etc.) take place. The 'recent' grading may be computed by determining the difference in time between the date the query is run and the date that an interaction occurred. If the interactions took place more recently, the weighting is higher, for example.

Continuing with FIG. 3, at block 311, the server computes a network graph of nodes and edges corresponding respectively to the users of the 'users of interest' list and their relationships, where the relationships or edges are weighted (e.g. also called the topic network). It can be appreciated that the principles of graph theory are applied here.

At block 312, the server identifies communities (e.g. $C_1$, $C_2$, . . . , $C_n$) amongst the users in the topic network. The identification of the communities can depend on the degree of connectedness between nodes within one community as compared to nodes within another community. That is, a community is defined by entities or nodes having a higher degree of connectedness internally (e.g. with respect to other nodes in the same community) than with respect to entities external to the defined community. As will be defined, the value or threshold for the degree of connectedness used to separate one community from another can be pre-defined (e.g. as provided by the community graph database 128 and/or user-defined from computing device 101). The resolution thus defines the density of the interconnectedness of the nodes within a community. Each identified community graph is thus a subset of the network graph of nodes and edges (the topic network) for each community. In one aspect, the community graph further displays both a visual representation of the users in the community (e.g. as nodes) with the community graph and a textual listing of the users in the community (e.g. as provided to display screen 125 of FIG. 1). In yet a further aspect, the display of the listing of users in the community is ranked according to degree of influence within the community and/or within all communities for topic T (e.g. as provided to display screen 125 of FIG. 1). In accordance with block 312, users $U_T$ are then split up into their community graph classifications such as $U_{C1}, U_{C2}, \ldots U_{Cn}$.

At block 313, for each given community (e.g. $C_1$), the server determines popular characteristic values for pre-defined characteristics (e.g. one or more of: common words and phrases, topics of conversations, common locations, common pictures, common meta data) associated with users (e.g. $U_{C1}$) within the given community based on their social network data. The selected characteristic (e.g. topic or location) can be user-defined (e.g. via input from the computing device 101) and/or automatically generated (e.g. based on characteristics for other communities within the same topic network, or based on previously used characteristics for the same topic T).

At block 314, the server outputs the identified communities (e.g. $C_1, C_2, \ldots, C_n$) and the popular characteristics associated with each given community. The identified communities can be output (e.g. via the server for display on the display screen 125) as a community graph in visual association with the characteristic values for a pre-defined characteristic for each community.

Figure 4:
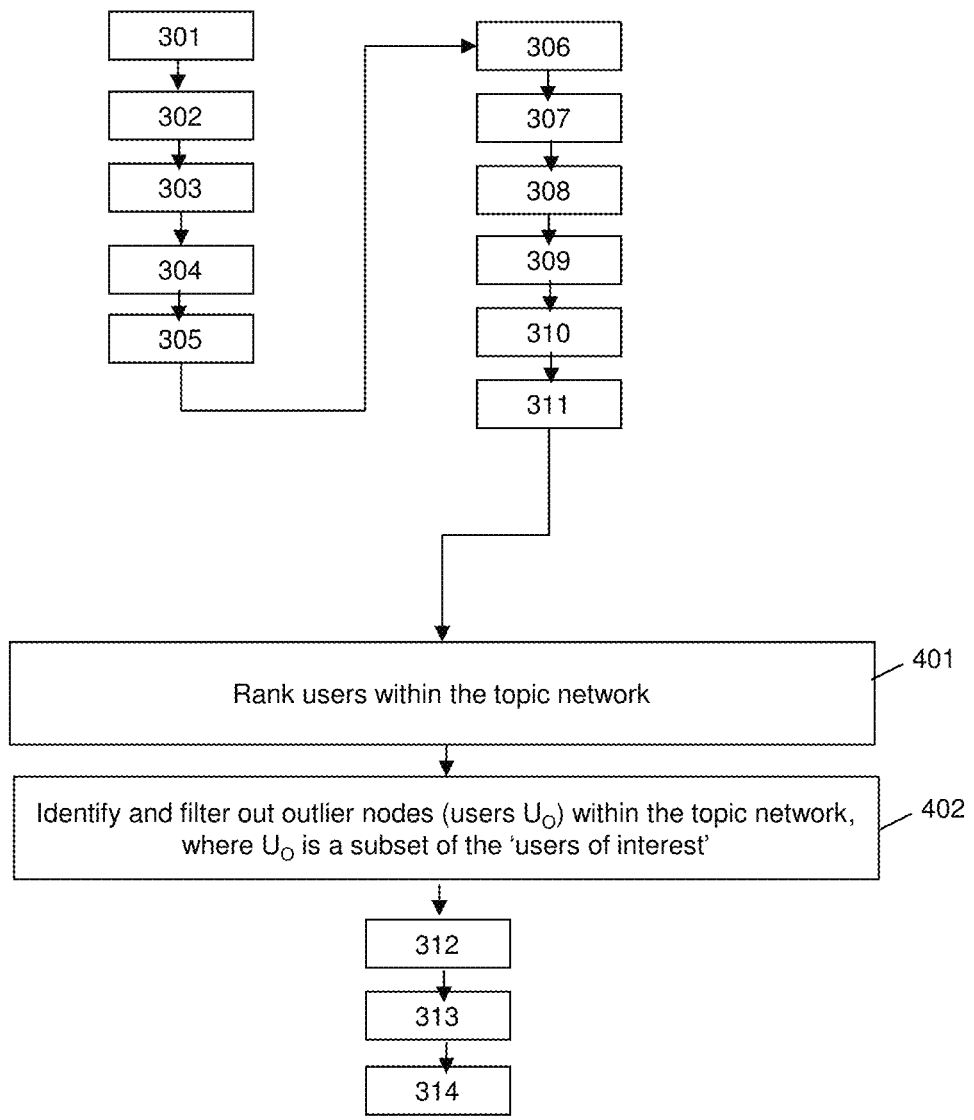
FIG. 4 is a flow diagram of another example embodiment of computer executable instructions for determining communities of influencers based on the weighted relationships.

Turning to FIG. 4, another example embodiment of computer executable or processor implemented instructions are provided. Blocks 301 to 311 are performed. Following block 311, at block 401, the server then ranks users within the topic network. For example, the server uses PageRank to measure importance of a user within the topic network and to rank the user based on the measure. Other non-limiting examples of ranking algorithms that can be used include: Eigenvector Centrality, Weighted Degree, Betweenness, Hub and Authority metrics.

The server identifies and filters out outlier nodes within the topic network (block 402). The outlier nodes are outlier users that are considered to be separate from a larger population or clusters of users in the topic network. The set of outlier users or nodes within the topic network is represented by $U_O$, where $U_O$ is a subset of the 'users of interest'. Further details about identifying and filtering the outlier nodes are described below.

The process continues with blocks 312 to 314, whereby the communities are formed after removing the outlier users $U_O$.

Figure 5:
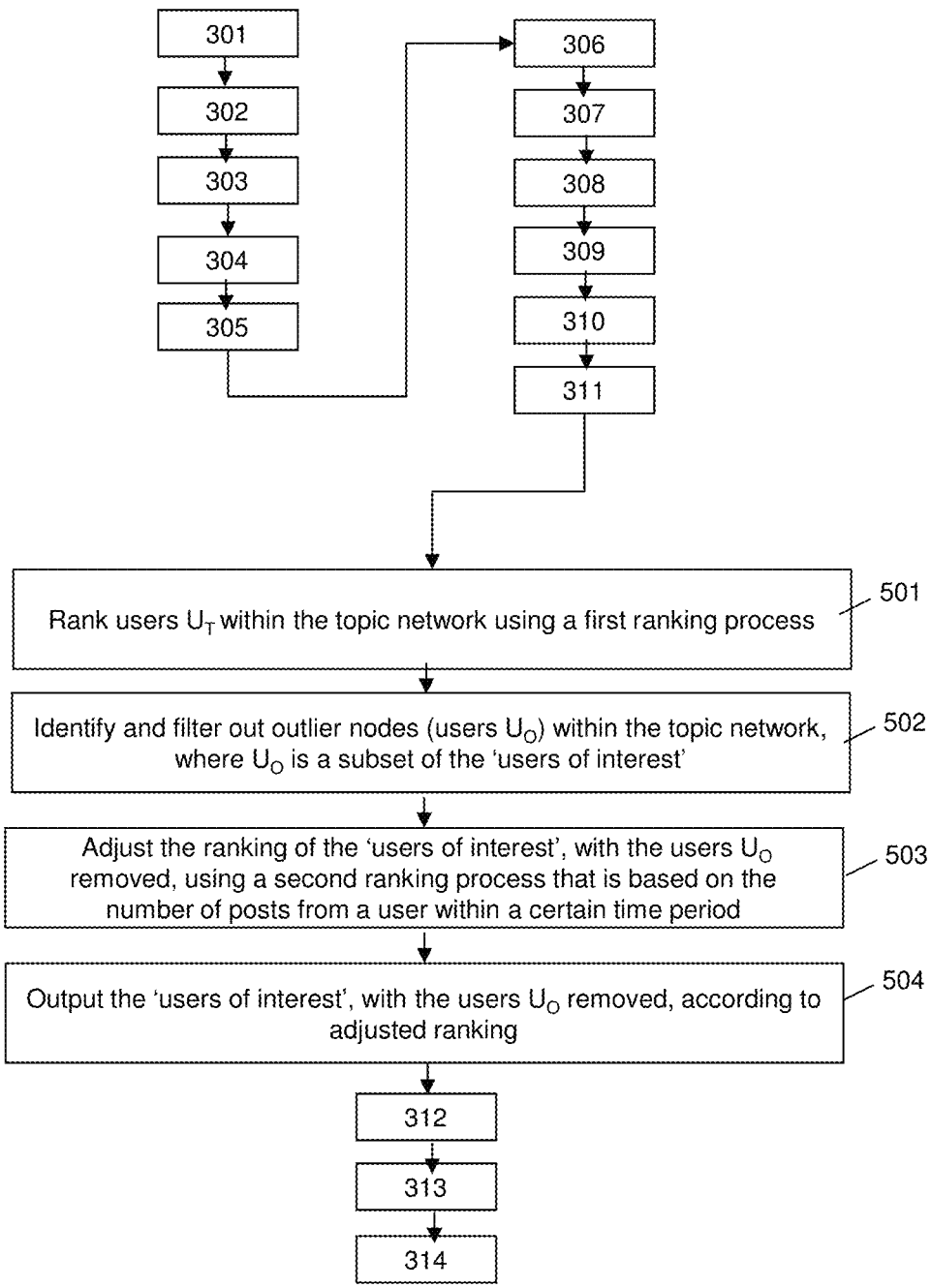
FIG. 5 is a flow diagram of another example embodiment of computer executable instructions for determining communities of influencers based on the weighted relationships.

Turning to FIG. 5, another example embodiment of computer executable or processor implemented instructions are provided. Blocks 301 to 311 are performed. Following block 311, the server ranks users within the topic network using a first ranking process (block 501). The first ranking process may or may not be the same ranking process used in block 401. The ranking is done to identify which users are the most influential in the given topic network for the given topic.

At block 502, the server identifies and filters out outlier nodes (users $U_O$) within the topic network, where $U_O$ is a subset of the 'users of interest'. At block 503, the server adjusts the ranking of the users, with the users $U_O$ removed, using a second ranking process that is based on the number of posts from a user within a certain time period. For example, the server determines that if a first user has a higher number of posts within the last two months compared to the number of posts of a second user within the same time period, then the first user's original ranking (from block 501) may be increased, while the second user's ranking remains the same or is decreased.

It is recognized that a network graph based on all the users may be very large. For example, there may be hundreds of millions of users. Analysing the entire data set of users may be computationally expensive and time consuming. Therefore, using the above process to find a smaller set of users that relate to the topic T reduces the amount of data to be analysed. This decreases the processing time as well. In an example embodiment, near real time results of influencers have been produced when analysing the entire social network platform of Twitter. Using the smaller set of users and the associated data, a new topic network is computed. The topic network is smaller (i.e. less nodes and less edges) than the social network graph that is inclusive of all users. Ranking users based on the topic network is much faster than ranking users based on the social network graph inclusive of all users.

Furthermore, identifying and filtering outlier nodes in the topic network helps to further improve the quality of the results.

Following block 504, blocks 312 to 314 are implemented.

Further details of the methods described in FIGS. 2 to 5 are described below.

Obtaining Social Network Data:

With respect to obtaining social network data, in an example embodiment, although not shown in FIGS. 3 to 5, the server 100 obtains social network data. The social network data may be obtained in various ways. Below is a non-limiting example embodiment of obtaining social network data.

Turning to FIG. 5, an example embodiment of computer executable instructions are shown for obtaining social network data. The data may be received by the server as a stream of data, including messages and meta data, in real time (block 600). This data is stored in the data store 116, for example, using a compressed row format (block 601). In a non-limiting example embodiment, a MySQL database is used. Blocks 600 and 601, for example, are implemented by the social networking data module 107.

In an example embodiment, the social network data received by social networking module 107 is copied, and the copies of the social network data are stored across multiple servers. This facilitates parallel processing when analysing the social network data. In other words, it is possible for one server to analyse one aspect of the social network data, while another server analyses another aspect of the social network data.

The server 100 indexes the messages using an indexer process (block 602). For example, the indexer process is a separate process from the storage process that includes scanning the messages as they materialize in the data store 116. In an example embodiment, the indexer process runs on a separate server by itself. This facilitates parallel processing. The indexer process is, for example, a multi-threaded process that materializes a table of indexed data for each day, or for some other given time period. The indexed data is outputted and stored in the index store 117 (block 604).

Figure 7:
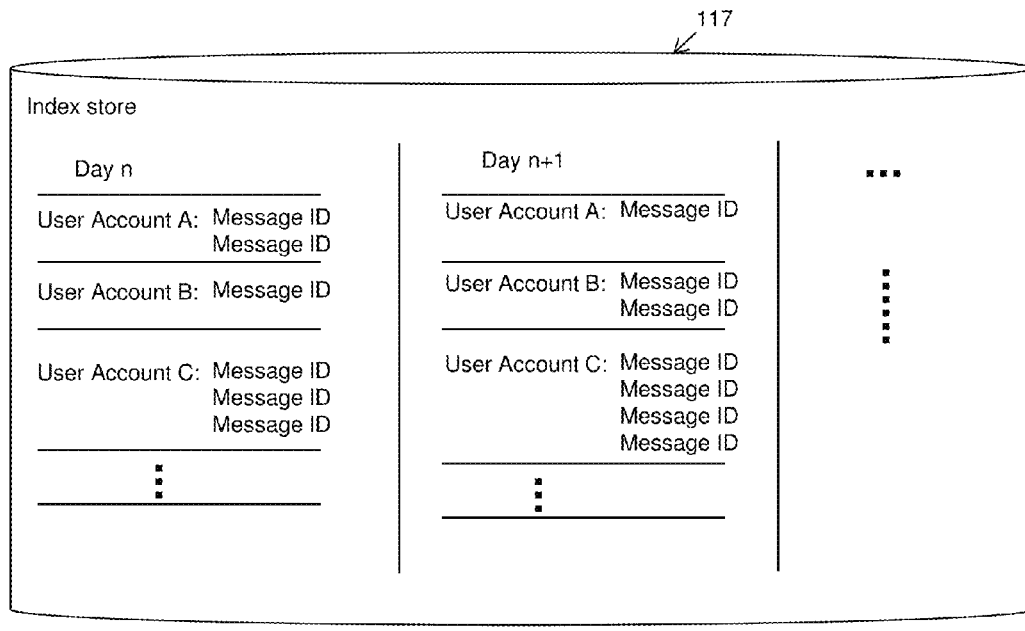
FIG. 7 is a block diagram of example data components in an index store.

Turning briefly to FIG. 7, which shows an example index store 117, each row in the table is a unique user account identifier and a corresponding list of all message identifiers that are produced that day, or that given time period. Other time periods, besides days, are used. In an example embodiment, millions of rows of data can be read and written in the index store 117 each day, and this process can occur as new data is materialized or added to the data store 116. In an example embodiment, a compressed row format is used in the index store 117. In another example embodiment, deadlocks are avoided by running relaxed transactional semantics, since this increases throughput across multiple threads when reading and writing the table. By way of background, a deadlock occurs when two or more tasks permanently block each other by each task having a lock on a resource which the other tasks are trying to lock.

Figure 6:
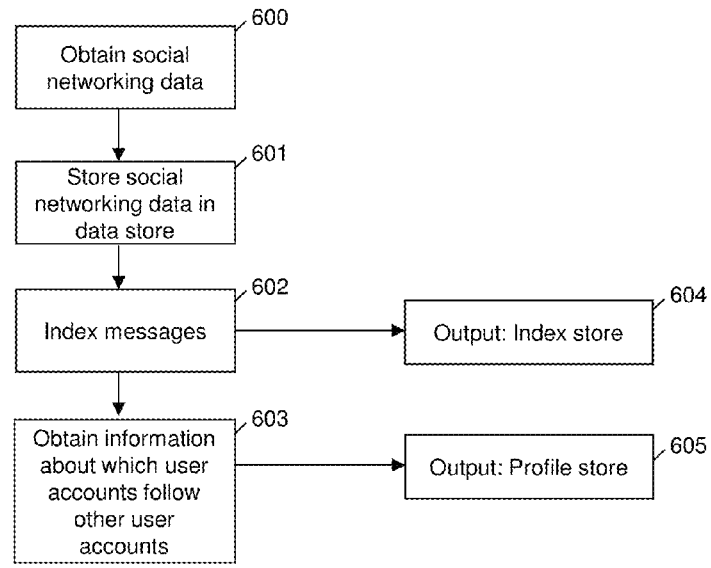
FIG. 6 is a flow diagram of an example embodiment of computer executable instructions for obtaining and storing social networking data.

Turning back to FIG. 6, the server 100 further obtains information about which user accounts follow other user accounts (block 603). This process includes identifying profile related meta data and storing the same in the profile store (block 605).

Figure 8:
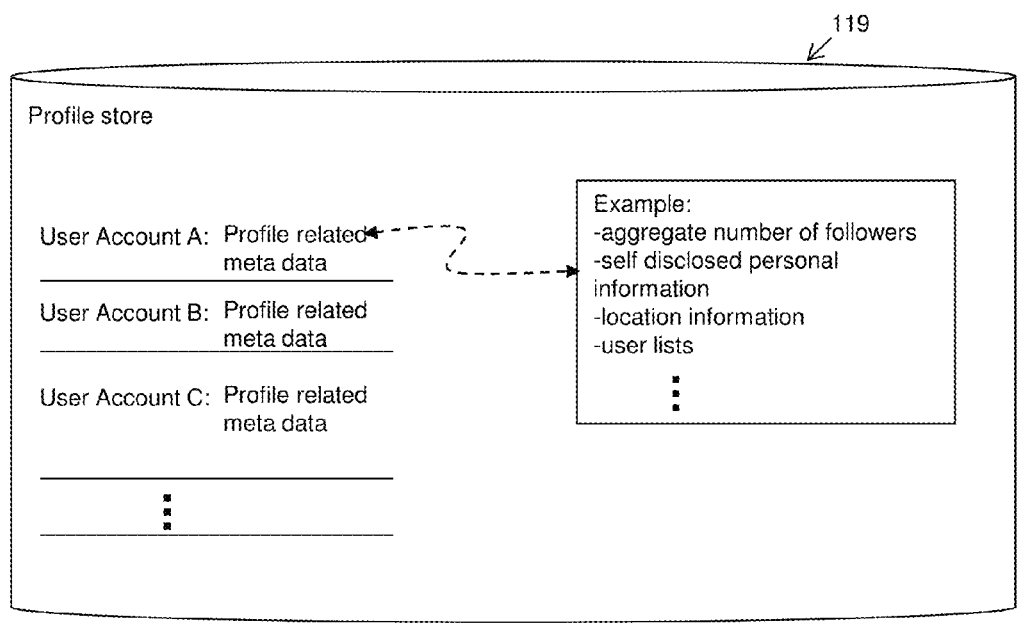
FIG. 8 is a block diagram of example data components in a profile store.

In FIG. 8, an example of the profile store 119 shows that for each user account, there is associated profile related meta data. The profile related meta data includes, for example, the aggregate number of followers of the user, self-disclosed personal information, location information, and user lists.

After the data is obtained and stored, it can be analyzed, for example, to identify experts and interests.

Determining Posts Related to a Topic:

With respect to determining posts related to a topic, as per block 302, it will be appreciated that such an operation can occur in various ways. Below are non-limiting example embodiments that can be used to determine posts related to a topic.

In an example embodiment, the operation of determining posts related to a topic (e.g. block 302) is based on the Sysomos search engine, and is described in U.S. Patent Application Publication No. 2009/0319518, filed Jul. 10, 2009 and titled "Method and System for Information Discovery and Text Analysis", the entire contents of which are hereby incorporated by reference. According to the processes described in U.S. Patent Application Publication No. 2009/0319518, a topic is used to identify popular documents within a certain time interval. In particular, when a topic (e.g. a keyword) is provided to the system of U.S. Patent Application Publication No. 2009/0319518, the system returns documents (e.g. posts, tweets, messages, articles, etc.) that are related and popular to the topic. Using the proposed systems and methods described herein, the executable instructions include the server 100 determining the author or authors of the popular documents. In this way, the author or authors are identified as the top users who are related to the given topic.

With respect to block 303, an upper limit N may be provided to identify the top N users who are related to the given topic, where N is a counting number. In an example embodiment, N is 5000, although other numbers can be used. The top N users may be determined according to a known or future known ranking algorithm, or using known or future known authority scoring algorithm for social media analytics.

It will be appreciated that other known and future known ways to identify posts related to a topic may be used in other example embodiments.

Identifying and Filtering Outlier Users in the Topic Network:

With respect to identifying and filtering outlier nodes (e.g. users) within the topic network, as per blocks 402 and 502, it will be appreciated that different computations can be used. Below is a non-limiting example embodiment of implementing blocks 402 and 502.

It is recognized that the data from the topic network can be improved by removing problematic outliers. For instance, a query using the topic "McCafe" referring to the McDonalds coffee brand also happened to bring back some users from the Philippines who are fans of a karaoke bar/cafe of the same name. Because they happen to be a tight-knit community, their influencer score is often high enough to rank in the critical top-ten list.

Figure 9:
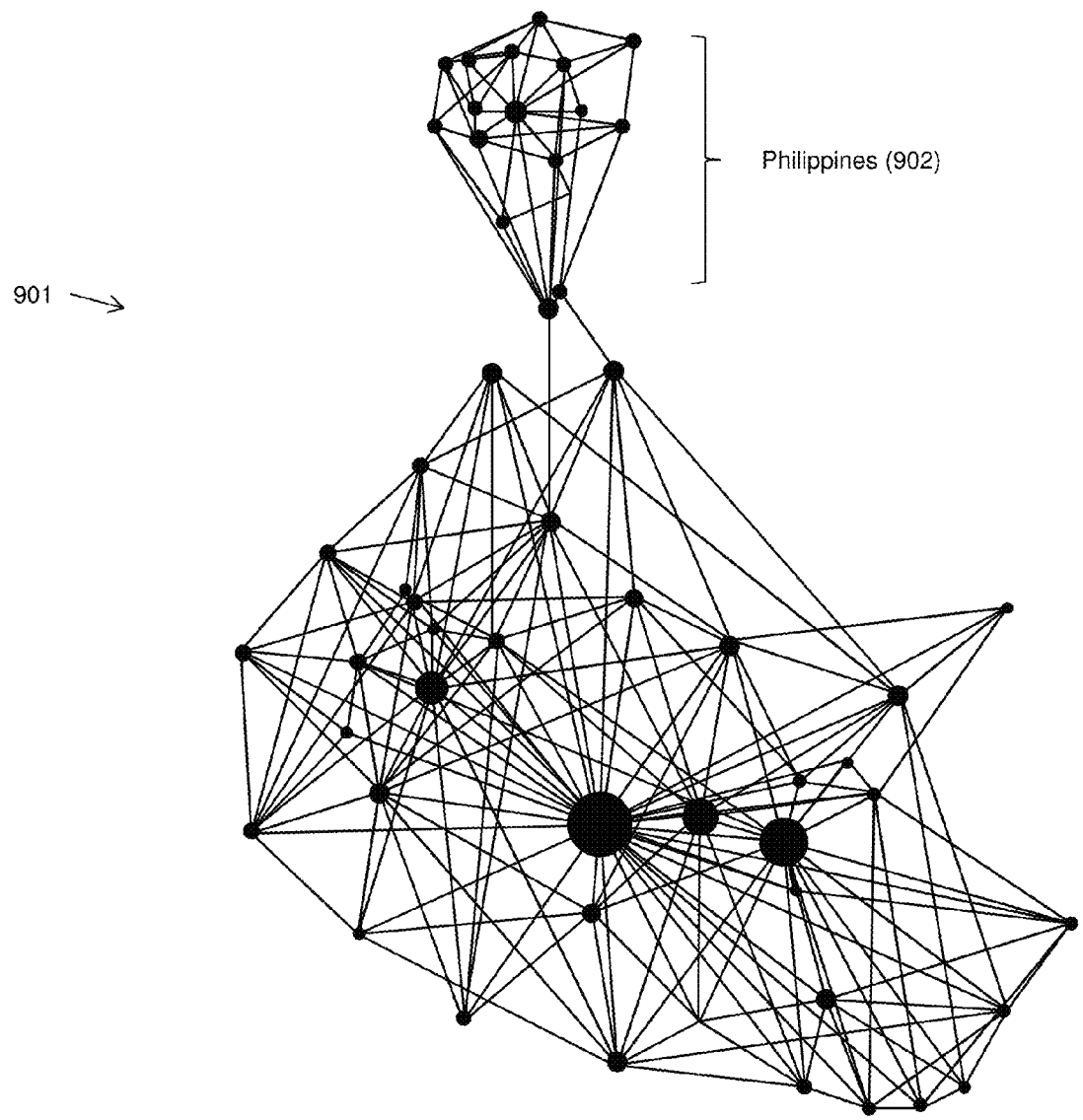
FIG. 9 is an illustration of an example topic network graph for the topic "McCafe".

Turning to FIG. 9, an illustration of an example embodiment of a topic network 901 showing unfiltered results is shown. The nodes represent the set of users related to the topic McCafe. Some of the nodes 902 or users are from the Philippines who are fans of a karaoke bar/cafe of the same name McCafe.

This phenomenon sometimes occurs in test cases, not limited to the test case of the topic McCafe. It is herein recognized that a user who looks for McCafe is not looking for both the McDonalds coffee and the Filipino karaoke bar, and thus this sub-network 1302 is considered noise.

To accomplish noise reduction, in an example embodiment, the server uses a network community detection algorithm that is a variant of a Modularity algorithm to identify and filter these types of outlier clusters in the topic queries. The Modularity algorithm is described in the article cited as Newman, M. E. J. (2006) "Modularity and community structure in networks," PROCEEDINGS-NATIONAL ACADEMY OF SCIENCES USA 103 (23): 8577-8696, the entire contents of which are herein incorporated by reference. In particular, the variant is a weighted version of the Modularity algorithm that considers the weighting of each edge or the link. This improves the quality of the communities detected since it groups people into communities, not only because they follow the people or are followed by people in the community, but also because there may be other interaction such as replies, re-posts, and mentions.

It will be appreciated that other types of clustering and community detection algorithms can be used to determine outliers in the topic network. The filtering helps to remove results that are unintended or sought after by a user looking for influencers associated with a topic.

Figure 10:
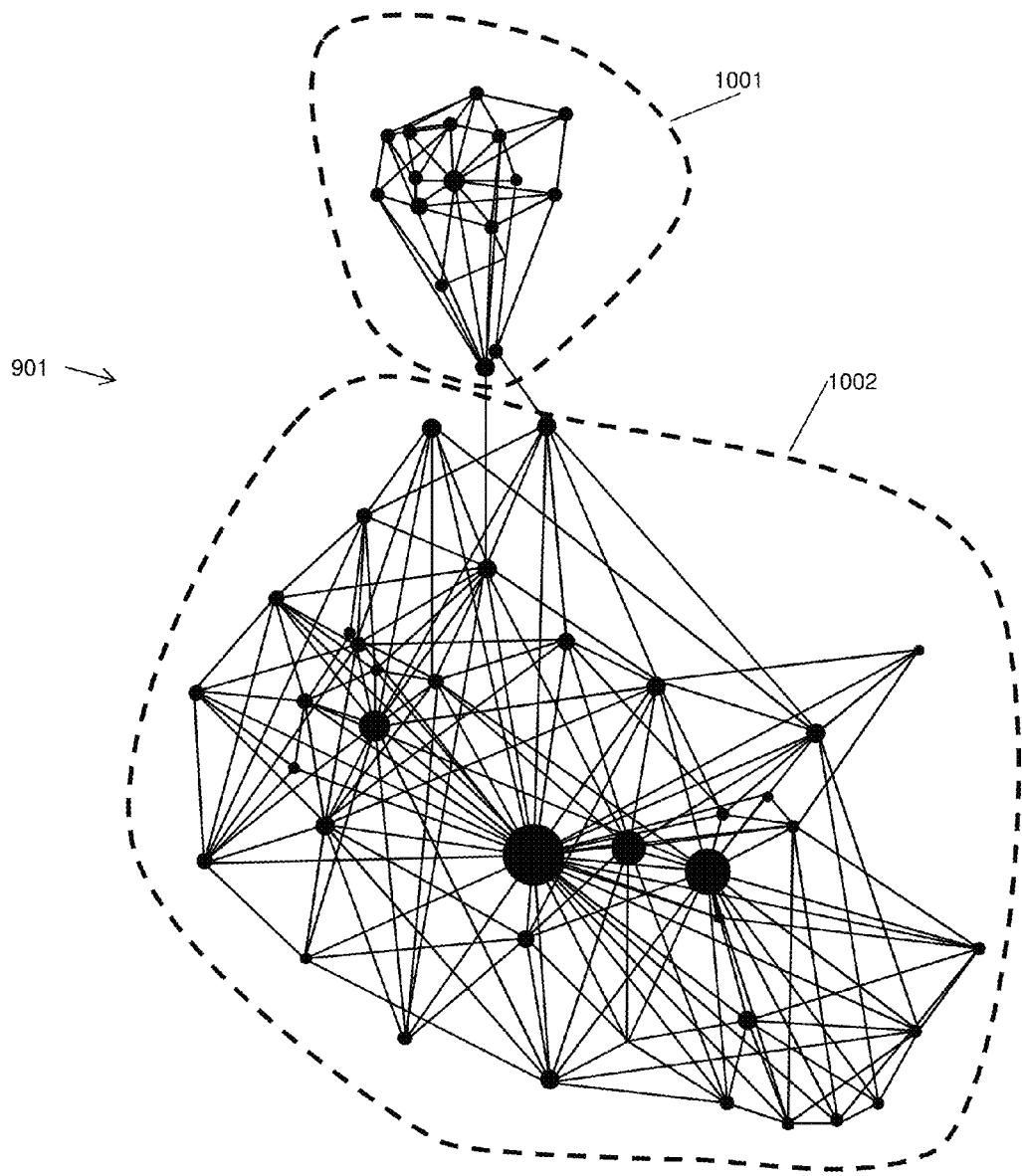
FIG. 10 is the illustration of the topic network graph in FIG. 9, showing decomposition of a main cluster and an outlier cluster.

As shown in FIG. 10, an outlier cluster 1001 is identified relative to a main cluster 1002 in the topic network 901. The outlier cluster of users $U_O$ 1001 is removed from the topic network, and the remaining users in the main cluster 1002 are used to form the ranked list of outputted influencers.

In an example embodiment, the server 100 computes the following instructions to filter out the outliers:

1. Execute the Modularity algorithm on the topic network.
2. The Modularity function decomposes the topic network into modular communities or sub-networks, and labels each node into one of X clusters/communities. In an example embodiment, X<n/2, as a community has more than one member, and n is the number of users, for example in the 'users of interest' list.
3. Sort the communities by the number of users within a community, and accept the communities with the largest populations.
4. When the cumulative sum of the node population exceeds 80% of the total, remove the remaining smallest communities from the topic network.

Figure 11:
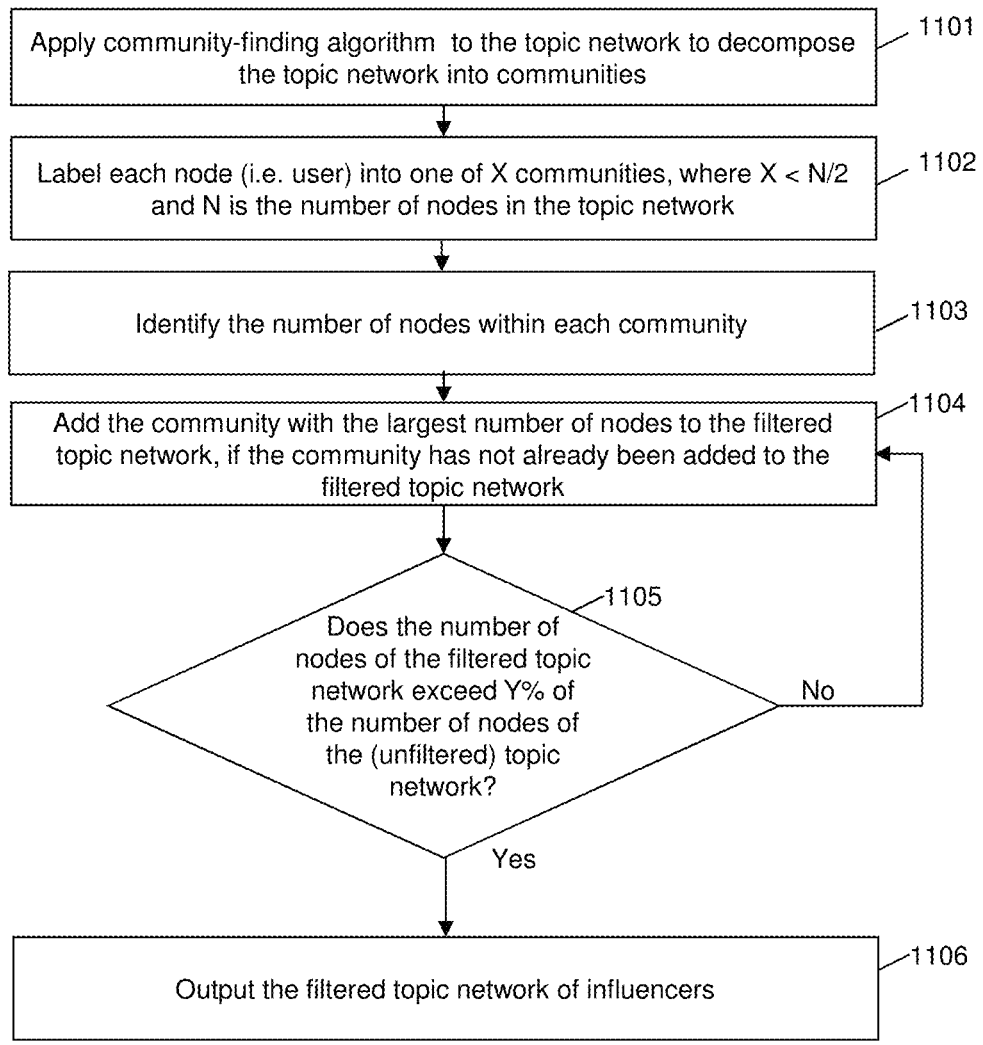
FIG. 11 is a flow diagram of an example embodiment of computer executable instructions for identifying and filtering outliers in a topic network based on decomposition of communities.

A general example embodiment of the computer executable instructions for identifying and filtering the topic network is described with respect to FIG. 11. It can be appreciated that these instructions can be used to execute blocks 402 and 502.

At block 1101, the server 100 applies a community-finding algorithm to the topic network to decompose the network into communities. Non-limiting examples of algorithms for finding communities include the Minimum-cut method, Hierarchical clustering, the Girvan-Newman algorithm, the Modularity algorithm referenced above, and Clique-based methods.

At block 1102, the server labels each node (i.e. user) into one of X communities, where X<n/2 and n is the number of nodes in the topic network.

At block 1103, the server identifies the number of nodes within each community.

The server then adds the community with the largest number of nodes to the filtered topic network, if that community has not already been added to the filtered topic network (block 1104). It can be appreciated that initially, the filtered topic network includes zero communities, and the first community added to the filtered topic network is the largest community. The same community from the unfiltered topic network cannot be added more than once to filtered topic network.

At block 1105, the server determines if the number of nodes of the filtered topic network exceeds, or is greater than, Y % of the number of nodes of the original or unfiltered topic network. In an example embodiment, Y % is 80%. Other percentage values for Y are also applicable. If not, then the process loops back to block 1104. When the condition of block 1105 is true, the process proceeds to block 1106.

Generally, when the number of nodes in the filtered topic network reaches or exceeds a majority percentage of the total number of nodes in the unfiltered topic network, then the main cluster has been identified and the remaining nodes, which are the outlier nodes (e.g. $U_O$), are also identified.

At block 1106, the filtered topic network is outputted, which does not include the outlier users $U_O$.

Identifying Communities

Figure 12:
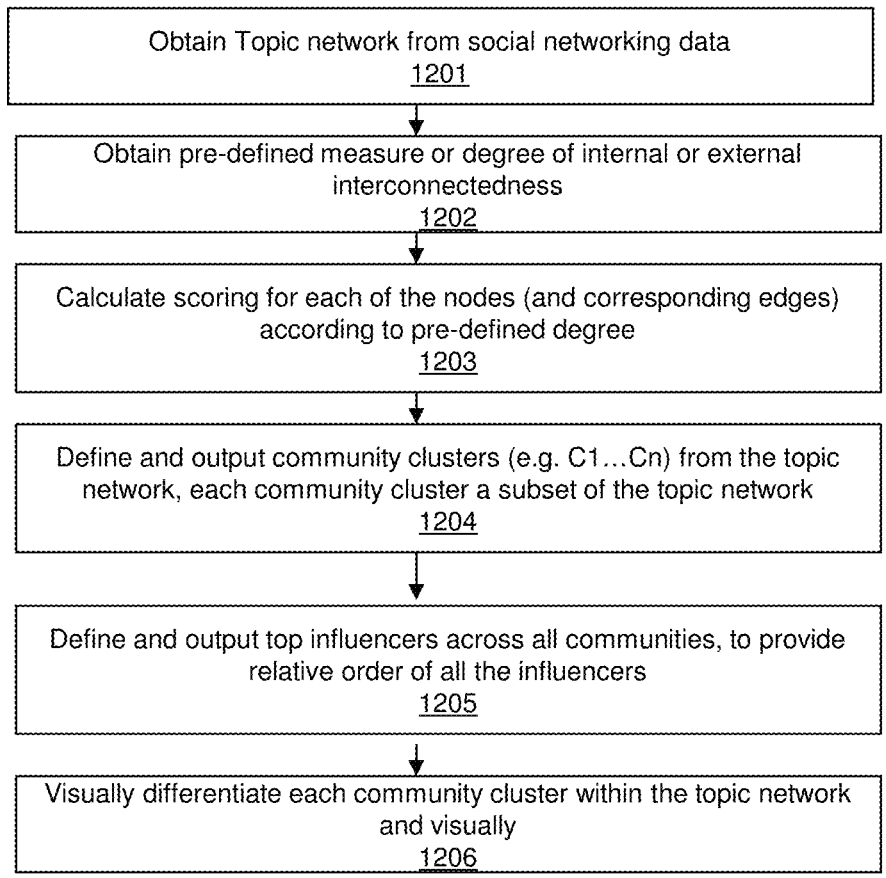
FIG. 12 is a flow diagram of example embodiment of computer executable instructions for identifying and providing community clusters from each topic network.

Turning to FIG. 12, an example embodiment of computer executable instructions are shown for identifying communities from social network data.

A feature of social network platforms is that users are following (or defining as a friend) another user. As described earlier, other types of relationships or interconnectedness can exist between users as illustrated by a plurality of nodes and edges within a topic network. Within the topic network, influencers can affect different clusters of users to varying degrees. That is, based on the process for identifying communities as described in relation to FIG. 12, the server is configured to identify a plurality of clusters within a single topic network, referred to as communities. Since influence is not uniform across a social network platform, the community identification process defined in relation to FIG. 12 is advantageous as it identifies the degree or depth of influence of each influencer (e.g. by associating with one community over another) across the topic network.

As will be defined in FIG. 12, the server is configured to provide a set of distinct communities (e.g. C1, . . . , Cn), and the top influencer(s) in each of the communities. In yet a preferred aspect, the server is configured to provide an aggregated list of the top influencers across all communities to provide the relative order of all the influencers.

At block 1201, the server is configured to obtain topic network graph information from social networking data as described earlier (e.g. FIGS. 3-5). The topic network visually illustrates relationships among the nodes a set of users from the 'users of interest' list, each represented as a node in the topic network graph and connected by edges to indicate a relationship (e.g. follower relationship, reply relationship, mention relationship, re-post relationship, etc.) between two users within the topic network graph. At block 1202, the server obtains a pre-defined degree or measure of internal and/or external interconnectedness (e.g. resolution) for use in defining the boundary between communities.

At block 1203, the server is configured to calculate scoring for each of the nodes (e.g. influencers) and edges according to the pre-defined degree of interconnectedness (e.g. resolution). That is, in one example, each user handle is assigned a Modularity class identifier (Mod ID) and a PageRank score (defining a degree of influence). In one aspect, the resolution parameter is configured to control the density and the number of communities identified. In a preferred aspect, a default resolution value of 2 which provides 2 to 10 communities is utilized by the server. In yet another aspect, the resolution value is user defined (e.g. via computing device 101 in FIG. 2) to generate higher or lower granularity of communities as desired for visualization of the community information.

At block 1204, the server is configured to define and output distinct community clusters (e.g. $C_1, C_2, \ldots, C_n$) thereby partitioning the users into $U_{C1} \ldots U_{Cn}$ such that each user defined by a node in the network is mapped to a respective community. In one example aspect, modularity analysis is used to define the communities such that each community has dense connections (high connectivity) between the cluster of nodes within the community but sparse connections with nodes in different communities (low connectivity). In one example aspect, the community detection process steps 1603-1606 can be implemented utilizing a modularity algorithm and/or a density algorithm (which measures internal connectivity). Furthermore, visualization of the results is implemented utilizing Gephi, an open source graph analysis package, and/or a javascript library in one aspect.

At block 1205, the server is configured to define and output top influencers across all communities and/or top influencers within each community and provide relative ordering of all influencers. In one example aspect, the top influencers are visually displayed alongside their community when a particular community is selected. In yet a further example aspect, at block 1205, the server is configured to provide an aggregated list of all the top influencers across all communities to provide the relative order of all the influencers.

At block 1206, the server is configured to visually depict and differentiate each community cluster (e.g. by colour coding, relative location, or other visual identification to differentiate one community from another). In a further aspect, at block 1206, the server is configured to provide a set of top influencers in each of the communities visually linked to the respective community. In yet a further aspect, the server at block 1206, the server is configured to vary the visual size of each node of the community graph to correspond to the score of the respective influencer (e.g. score of influence). As output from block 1206, the edges from the nodes show connections between each of the users, within their community and across other communities.

Figure 13:
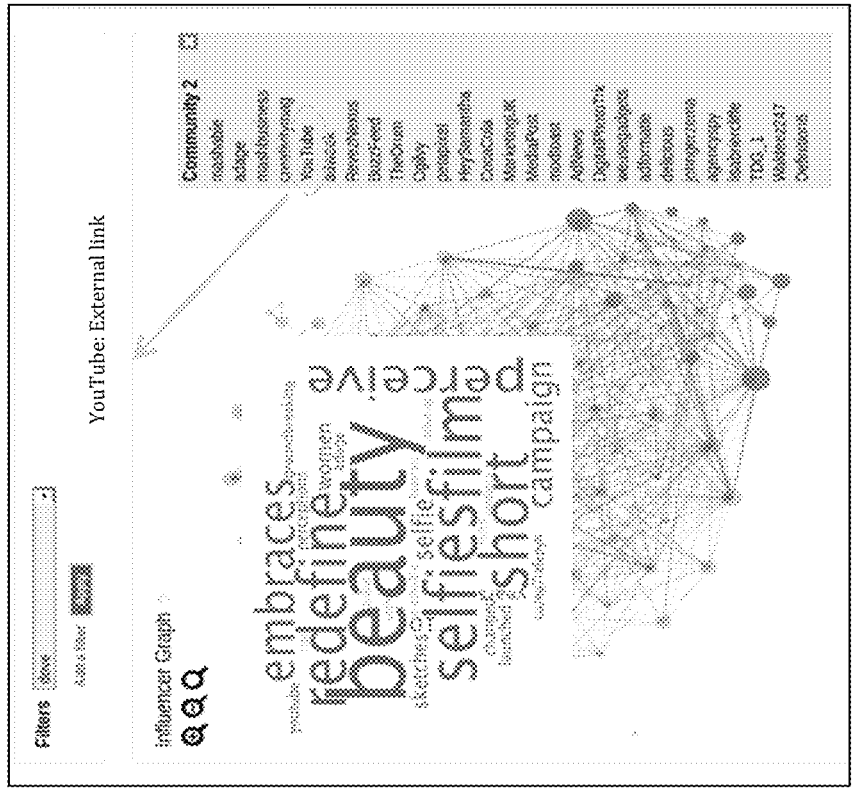
FIGS. 13A and 13B illustrate exemplary screen shots for interacting with a GUI displaying the influencer communities within a topic network, where
Figure 13:
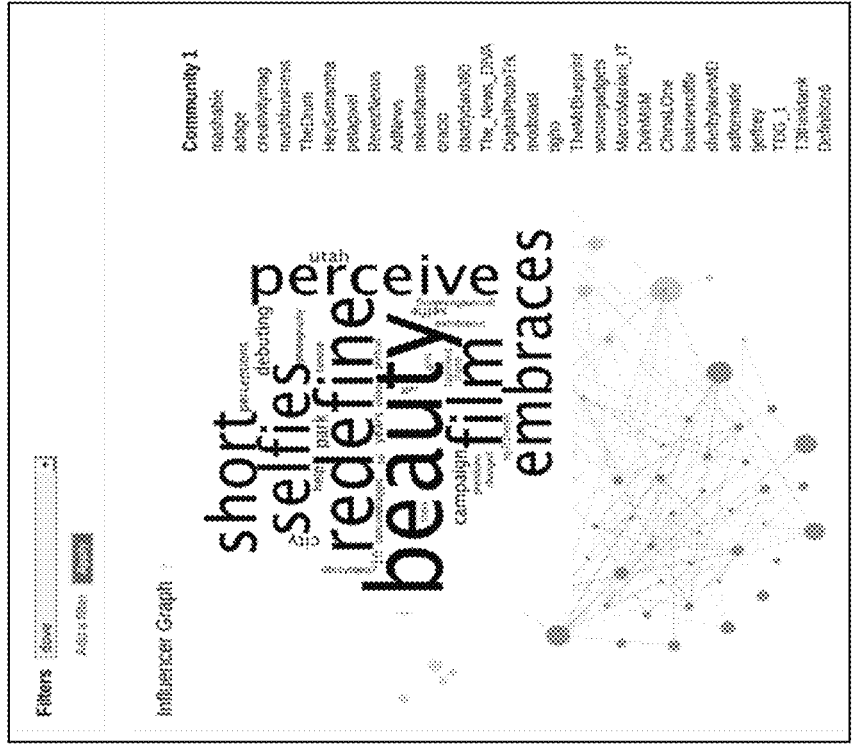
Figure 14:
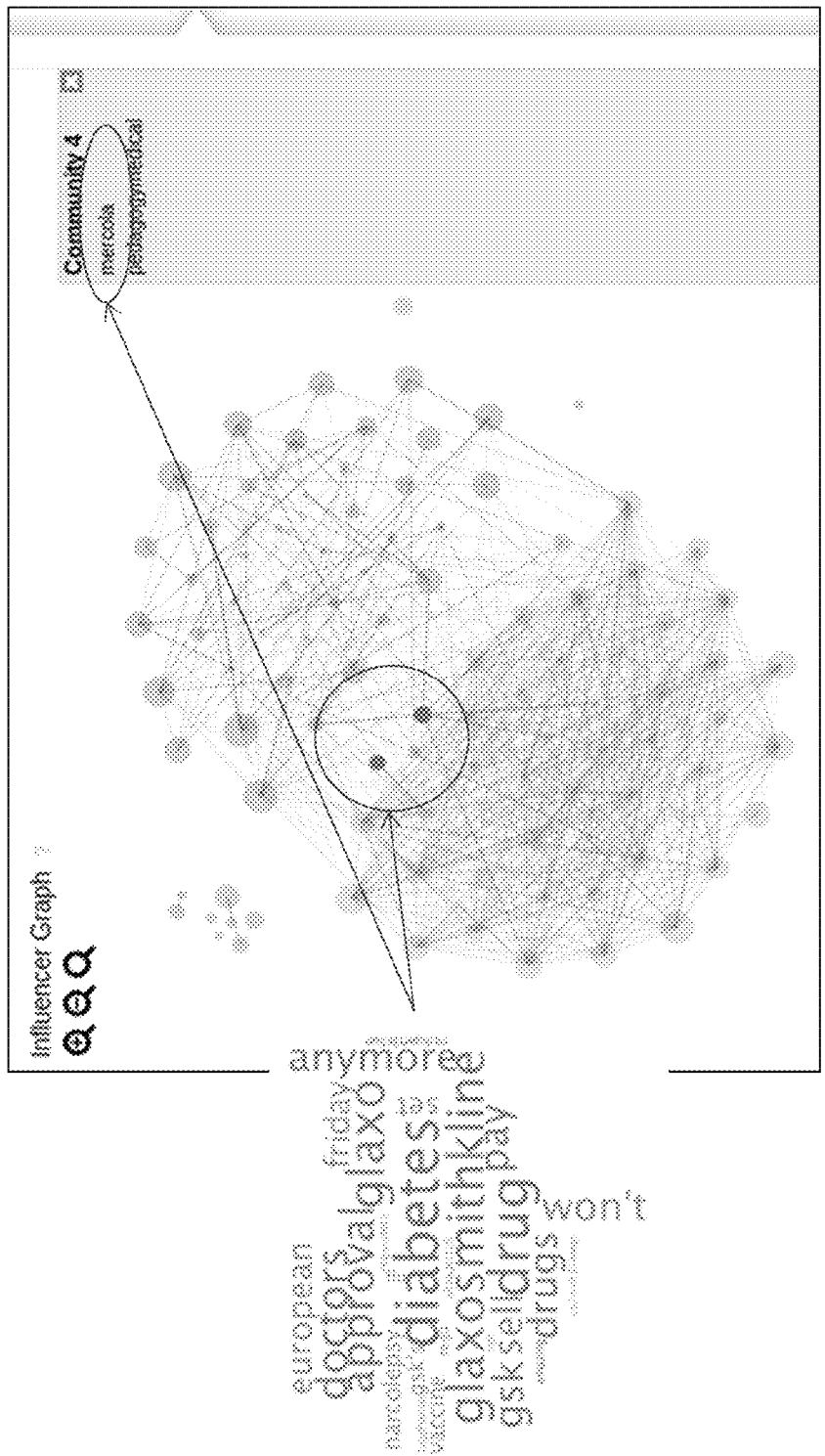
FIG. 14 illustrates an exemplary screen shots for interacting with a GUI displaying the influencer communities within a topic network using weight analysis.

Accordingly, as will be shown in FIGS. 13 to 15 the visualization of the communities and the influencers (e.g. the top influencers ranked within each communities and/or a listing of top influencers across all communities) allow an end user (e.g. a user of computing device 101 in FIG. 2) to visualize the scale and relative significance of each of the influencers in their associated communities.

Identifying Popular Characteristics within a Given Community

As described in relation to FIGS. 3 to 5, in yet a further aspect, the server is configured to determine, for each given community (e.g. C1) provided by block 1204, popular characteristic values for pre-defined characteristics (e.g. common keywords and phrases, topics of conversations, common locations, common images, common meta data) associated with users (e.g. UC1) within the given community (e.g. $C_1$), based on their social network data. Accordingly, trends or commonalities by examining the pre-defined set of characteristics (e.g. topics of conversation) for users $U_{C1}$ within each community $C_1$ can be defined. In an example aspect, the top listing of characteristic values (e.g. top topics of conversation among all users within each community) is depicted at block 1205 and output to the computing device 101 (shown in FIG. 2) for display in association with each community.

Displaying Communities and Popular Characteristics

Referring to FIGS. 13 to 15 shown are screen shots as provided from GUI module 106 of the server and output to display screen 125 of computing device (FIG. 2) for visualization of the community clusters from a topic network and visualization of the popular characteristics in each community. The server provides an interactive interface for selecting communities and/or nodes within the topic network/particular community for visually revealing details about each node (e.g. user, community information and degree of influence). Accordingly, FIGS. 13 to 15 illustrate the interactive visualization of the Influencer Communities and their characteristic (e.g. conversations for each community in a WordCloud visualization technique). As also shown in FIGS. 13 to 15, each community (e.g. consisting of edges and nodes) is visually differentiated from another community (e.g. by colour coding) and each node is sized according to degree of influence within the entire topic network. The degree of influence of user, for example, corresponds to the ranking of a user account within a community or the topic network. Furthermore, by selecting a particular community (e.g. visual selection using a mouse or pointer of the community from the topic network), the community values are then depicted (e.g. highlighting the community within the topic network graph, revealing the top influencers within the community, and revealing popular characteristic values for top topics of conversation for the selected community). In FIGS. 13 to 15, the visualization of the popular characteristic values on the display screen (e.g. screen of computing device 101 in FIG. 2) is shown as a word cloud which depicts top conversation topics within the selected community as well as an indication of the frequency of use of each topic within all users of the particular community.

For example, nodes are color coded to visually associate them with their respective community and the size of each node is proportional to the Influencer score in their community (color coded) relative to the overall topic network. When selecting a node (e.g. hovering the mouse pointer over a node), the Twitter handle pops up and the information for that handle is displayed is displayed on screen.

In another example, when choosing a sub-graph visually highlights the top Influencers in that selected community, and gives a visual representation on the screen (e.g. wordcloud of the conversations in that community). Insight into community behavior; positive/negative sentiment is shown.

Example Scenario: Personal Care Products Brand

In an example embodiment, the name of a personal care product brand was inputted into the process shown in FIG. 3. The graphical output of the community network showing influencers, using weighted analysis, are shown in FIG. 13b. A personal care products company released a YouTube video as part of one of their campaigns. The campaign's success was that hundreds of people shared the YouTube video through Twitter. FIG. 13a shows a comparative analysis of the results obtained for an influencer graph that is not weighted, while FIG. 13b shows an influencer graph that uses weighted analysis. The weighted analysis is able to identify "YouTube" as an important influencer while the un-weighted analysis does not recognize YouTibe. For the personal care products company seeing YouTube as an influencer immediately shows that the video campaign was a hit.

Example Scenario: Pharmaceutical Company

In an example embodiment, the name of a pharmaceutical company was inputted into the process shown in FIG. 3. The graphical output of the community network showing influencers, using weighted analysis, is shown in FIG. 14. For a pharmaceutical company when a critical public relations blunder occurs (e.g., incorrect information about one of their drugs is doing the rounds), the company needs to identify influencers who can help deal with the situation as soon as possible. For example, a pharmaceutical company had announced that the company would no longer pay doctors or other health care professionals to promote the company's products. An article about the company's decision appeared on multiple websites: a website by Dr. Mercola, a New York Times Best Selling Author, also featured in TIME magazine, LA Times, CNN, Fox News, ABC News, and the Today Show.

In FIG. 14, the weighted influencer process pulled out @mercola (the website's twitter handle) as one of the top influencers in the community that talks about this topic. Therefore, when the need arises the pharmaceutical company can consider the website or web platform of 'mercola' as an important influencer to spread any important information.

Example Scenario: Super Bowl

In an example embodiment, the topic "Super Bowl" was inputted into the process shown in FIG. 3. The graphical output of the community network showing influencers, using weighted analysis, is shown in FIG. 15b. By way of background, the Super Bowl is a popular sporting event in the United States. Many big brands and television channels want to take advantage of the Super Bowl by organizing a public relations event associated to it. For example, before the previous Super Bowl, "The Ellen show" or "The Ellen DeGeneres Show", which is a talk show, gave out free tickets to the Super Bowl event for winners of some contest. The success of the contest can be seen when "@theellenshow," the show's official twitter handle appears as a top influencer and there is an entire community talking about the public relations initiative. FIG. 15 shows a comparative analysis of the results obtained for the unweighted analysis (FIG. 15a) and the weighted analysis (FIG. 15b). Both the weighted and the unweighted versions identify communities that talk about winning free tickets for the super bowl, but the weighted analysis is able to identify the source or influencer "@theellenshow", as shown in FIG. 15b.

The Super Bowl case study. (A) Depicts the old methodology, which pulls up influencers who are primarily talking about the Super Bowl, Broncos, or Seahawks or free tickets. (B) Depicts the results of the new methodology that in addition pulls out "theellenshow."

Thus, there is presented a system and method for identifying influencers within their social communities (based on obtained social networking data) for a given query topic. It can also be seen that influencers do not have uniform characteristics, and there are in fact communities of influencers even within a given topic network. The systems and methods presented herein are utilized to output visualization on the computing device (e.g. computing device 101) visualized in a network graph to display the relative influencer of entities or individuals and their respective communities. Additionally popular characteristic values (e.g. based on pre-defined characteristic such as topics of conversation) are visually depicted on the display screen of the computing device for each community showing the top or relevant topics. The topics can be depicted as word clouds of each community's conversation to visually reveal the behavioural characteristics of the individual communities.

General example embodiments of the proposed computing system and method are provided below.

In an example embodiment there is a provided a method performed by a server for determining weighted influence of at least one user account for a topic. In another example embodiment, a server system or server is provided to determine weighted influence of at least one user account for a topic, the server system including a processor, memory and executable instructions stored on the memory. The method or the instructions, or both, comprising: the server obtaining the topic; determining posts related to the topic within one or more social data networks, the server having access to data from the one or more social data networks; characterizing each post as one or more of: a reply post to another posting, a mention post of another user account, and a re-posting of an original posting; generating a group of user accounts comprising any user account that authored the posting, being mentioned in the mention post, that posted the original posting, that authored one or more posts that are related to the topic, or any combination thereof; representing each of the user accounts in the group as a node in a connected graph and establishing an edge between one or more pairs of nodes; for each edge between a given pair of nodes, determining a weighting that is a function of one or more of: whether a follower-followee relationship exists, a number of mention posts, a number of reply posts, and a number of re-posts involving the given pair of nodes; and computing a topic network graph using each of the nodes and the edges, each edge associated with a weighting.

In an example aspect, when there the follower-followee relationship exists between the given pair of nodes, initializing the weighting of the edge to a default value and further adjusting the weighting based on any one or more of the number of mention posts, the number of reply posts, and the number of re-posts involving the given pair of nodes.

In an example aspect, the method or the instructions, or both, further comprising: ranking the user accounts within the topic network graph to filter outlier nodes within the topic network graph; identifying at least two distinct communities amongst the user accounts within the filtered topic network graph, each community associated with a subset of the user accounts; identifying attributes associated with each community; and outputting each community associated with the corresponding attributes.

In an example aspect, the method or instructions or both, further comprising: ranking the user accounts within each community and providing, for each community, a ranked listing of the user accounts mapped to the corresponding community.

In an example aspect, ranking the user accounts further comprises: mapping each ranked user account to the respective community and outputting a ranked listing of the user accounts for the at least two communities.

In an example aspect, the attributes are associated with each user account's interaction with the social data networks.

In an example aspect, the attributes are displayed in association with a combined frequency of the attribute for the user accounts.

In an example aspect, the attributes are frequency of topics of conversation for the users within a particular community.

In another example embodiment, a method is performed by a server for determining at least one user account that is influential for atopic. The method includes: obtaining the topic; determining a plurality of user accounts within a social data network that are related to the topic; representing each of the user accounts as a node in a connected graph and determining an existence of a relationship between each of the user accounts; computing a topic network graph using each of the user accounts as nodes and the corresponding relationships as edges between each of the nodes; ranking the user accounts within the topic network graph to filter outlier nodes within the topic network graph; identifying at least two distinct communities amongst the user accounts within the filtered topic network graph, each community associated with a subset of the user accounts; identifying attributes associated with each community; and outputting each community associated with the corresponding attributes.

In an example aspect, the method further includes: ranking the user accounts within each community and providing, for each community, a ranked listing of the user accounts mapped to the corresponding community.

In an example aspect, wherein ranking the user accounts further comprises: mapping each ranked user account to the respective community and outputting a ranked listing of the user accounts for the at least two communities.

In an example aspect, wherein the attributes are associated with each user account's interaction with the social data network.

In an example aspect, wherein the attributes are displayed in association with a combined frequency of the attribute for the user accounts.

In an example aspect, wherein the attributes are frequency of topics of conversation for the users within a particular community.

In an example aspect, the method further includes displaying in a graphical user interface the at least two distinct communities comprising color coded nodes and edges, wherein at least a first portion of the color coded nodes and edges is a first color associated with a first community and a least a second portion of the color coded nodes and edges is a second color associated with a second community.

In an example aspect, wherein a size of a given color coded node is associated with a degree of influence of a given user account represented by the given color coded node.

In an example aspect, the method further includes displaying words associated with a given community, the words corresponding to the attributes of the given community.

In an example aspect, the method further includes detecting a user-controlled pointer interacting with a given community in the graphical user interface, and at least one of: displaying one or more top ranked user accounts in the given community; visually highlighting the given community; and displaying words associated with a given community, the words corresponding to the attributes of the given community.

In another example embodiment, a computing system is provided for determining at least one user account that is influential for atopic. The computing system includes: a communication device; a memory; and a processor configured to at least: obtain the topic; determine a plurality of user accounts within a social data network that are related to the topic; represent each of the user accounts as a node in a connected graph and determining an existence of a relationship between each of the user accounts; compute a topic network graph using each of the user accounts as nodes and the corresponding relationships as edges between each of the nodes; rank the user accounts within the topic network graph to filter outlier nodes within the topic network graph; identify at least two distinct communities amongst the user accounts within the filtered topic network graph, each community associated with a subset of the user accounts; identify attributes associated with each community; and output each community associated with the corresponding attributes.

In another example embodiment, a method is provided that is performed by a server for determining one or more users who are influential for a topic. The method includes: obtaining a topic; determining users within a social data network that are related to the topic; modeling each of the users as a node and determining relationships between each of the users; computing a topic network graph using the users as nodes and the relationships as edges; ranking the users within the topic network graph; identifying and filtering outlier nodes within the topic network graph; and outputting users remaining within the topic network graph according to their associated rank.

In an example aspect, the users that at least one of consume and generate content comprising the topic are considered the users related to the topic.

In another example aspect, in the topic network graph, an edge defined between at least two users represents a friend connection between the at least two users.

In another example aspect, in the topic network graph, an edge defined between at least two users represents a follower-followee connection between the at least two users, and wherein one of the at least two users is a follower and the other of the least two users is a followee.

In another example aspect, in the topic network graph, an edge defined between at least two users represents a reply connection between the at least two users, and wherein one of the at least two users replies to a posting made by the other of the at least two users.

In another example aspect, in the topic network graph, an edge defined between at least two users represents a re-post connection between the at least two users, and wherein one of the at least two users re-posts a posting made by the other of the at least two users.

In another example aspect, the ranking includes using a PageRank algorithm to measure importance of a given user within the topic network graph.

In another example aspect, the ranking includes using at least one of: Eigenvector Centrality, Weighted Degree, Betweenness, and Hub and Authority metrics.

In another example aspect, identifying and filtering the outlier nodes within the topic network graph includes: applying at least one of a clustering algorithm, a modularity algorithm and a community detection algorithm on the topic network graph to output multiple communities; sorting the multiple communities by a number of users within each of the multiple communities; selecting a number n of the communities with the largest number of users, wherein a cumulative sum of the users in the n number of the communities at least meets a percentage threshold of a total number of users in the topic network graph; and establishing users in unselected communities as the outlier nodes.

In another example embodiment, a computing system is provided for determining one or more users who are influential for a topic. The computing system includes: a communication device; memory; and a processor. The processor is configured to at least: obtain a topic; determine users within a social data network that are related to the topic; model each of the users as a node and determining relationships between each of the users; compute a topic network graph using the users as nodes and the relationships as edges; rank the users within the topic network graph; identify and filter outlier nodes within the topic network graph; and output users remaining within the topic network graph according to their associated rank.

It will be appreciated that different features of the example embodiments of the system and methods, as described herein, may be combined with each other in different ways. In other words, different modules, operations and components may be used together according to other example embodiments, although not specifically stated.

The steps or operations in the flow diagrams described herein are just for example. There may be many variations to these steps or operations without departing from the spirit of the invention or inventions. For instance, the steps may be performed in a differing order, or steps may be added, deleted, or modified.

The GUIs and screen shots described herein are just for example. There may be variations to the graphical and interactive elements without departing from the spirit of the invention or inventions. For example, such elements can be positioned in different places, or added, deleted, or modified.

Although the above has been described with reference to certain specific embodiments, various modifications thereof will be apparent to those skilled in the art without departing from the scope of the claims appended hereto.

The invention claimed is:

1. A method performed by a server for determining weighted influence of at least one user account for a topic, the method comprising:
   the server obtaining the topic;
   determining posts related to the topic within one or more social data networks, the server having access to data from the one or more social data networks;
   characterizing each post as one or more of: a reply post to another posting, a mention post of another user account, and a re-posting of an original posting;
   generating a group of user accounts comprising any user account that authored the posting, that is mentioned in the mention post, that posted the original posting, that authored one or more posts that are related to the topic, or any combination thereof;
   representing each of the user accounts in the group as a node in a connected graph and establishing an edge between one or more pairs of nodes;
   for each edge between a given pair of nodes, determining a weighting that is a function of one or more of: whether a follower-followee relationship exists, a number of mention posts, a number of reply posts, and a number of re-posts involving the given pair of nodes; and
   computing a topic network graph using each of the nodes and the edges, each edge associated with a weighting.

2. The method of claim 1 wherein, when the follower-followee relationship exists between the given pair of nodes, initializing the weighting of the edge to a default value and further adjusting the weighting based on any one or more of the number of mention posts, the number of reply posts, and the number of re-posts involving the given pair of nodes.

3. The method of claim 1 further comprising:
   ranking the user accounts within the topic network graph to filter outlier nodes within the topic network graph;
   identifying at least two distinct communities amongst the user accounts within the filtered topic network graph, each community associated with a subset of the user accounts;
   identifying attributes associated with each community; and
   outputting each community associated with the corresponding attributes.

4. The method according to claim 3, further comprising: ranking the user accounts within each community and providing, for each community, a ranked listing of the user accounts mapped to the corresponding community.

5. The method according to claim 4, wherein ranking the user accounts further comprises: mapping each ranked user account to the respective community and outputting a ranked listing of the user accounts for the at least two communities.

6. The method according to claim 3, wherein the attributes are associated with each user account's interaction with the social data networks.

7. The method according to claim 3, wherein the attributes are displayed in association with a combined frequency of the attribute for the user accounts.

8. The method according to claim 3, wherein the attributes are frequency of topics of conversation for the users within a particular community.

9. The method according to claim 3, further comprising displaying in a graphical user interface the at least two distinct communities comprising color coded nodes and edges, wherein at least a first portion of the color coded nodes and edges is a first color associated with a first community and a least a second portion of the color coded nodes and edges is a second color associated with a second community.

10. The method according to claim 9 wherein a size of a given color coded node is associated with a degree of influence of a given user account represented by the given color coded node.

11. A computing system for determining weighted influence of at least one user account for a topic, the computing system comprising:
    a communication device;
    memory; and
    a processor configured to at least:
    obtain the topic;
    determine posts related to the topic within one or more social data networks, the computing system having access to data from the one or more social data networks;
    characterize each post as one or more of: a reply post to another posting, a mention post of another user account, and a re-posting of an original posting;
    generate a group of user accounts comprising any user account that authored the posting, that is mentioned in the mention post, that posted the original posting, that authored one or more posts that are related to the topic, or any combination thereof;
    represent each of the user accounts in the group as a node in a connected graph and establishing an edge between one or more pairs of nodes;
    for each edge between a given pair of nodes, determining a weighting that is a function of one or more of: whether a follower-followee relationship exists, a number of mention posts, a number of reply posts, and a number of re-posts involving the given pair of nodes; and
    compute a topic network graph using each of the nodes and the edges, each edge associated with a weighting.

12. The computing system of claim 11 wherein, when the follower-followee relationship exists between the given pair of nodes, initializing the weighting of the edge to a default value and further adjusting the weighting based on any one or more of the number of mention posts, the number of reply posts, and the number of re-posts involving the given pair of nodes.

13. The computing system of claim 11 wherein the processor is further configured to:
    rank the user accounts within the topic network graph to filter outlier nodes within the topic network graph;
    identify at least two distinct communities amongst the user accounts within the filtered topic network graph, each community associated with a subset of the user accounts;
    identify attributes associated with each community; and
    output each community associated with the corresponding attributes.

14. The computing system according to claim 13, wherein the processor is further to: rank the user accounts within each community and providing, for each community, a ranked listing of the user accounts mapped to the corresponding community.

15. The computing system according to claim 14, wherein ranking the user accounts further comprises: mapping each ranked user account to the respective community and outputting a ranked listing of the user accounts for the at least two communities.

16. The computing system according to claim 13, wherein the attributes are associated with each user account's interaction with the social data networks.

17. The computing system according to claim 13, wherein the attributes are displayed in association with a combined frequency of the attribute for the user accounts.

18. The computing system according to claim 13, wherein the attributes are frequency of topics of conversation for the users within a particular community.

19. The computing system according to claim 13, further comprising a display device, and wherein the processor is further configured to display in a graphical user interface the at least two distinct communities comprising color coded nodes and edges, wherein at least a first portion of the color coded nodes and edges is a first color associated with a first community and a least a second portion of the color coded nodes and edges is a second color associated with a second community.

20. The computing system according to claim 19 wherein a size of a given color coded node is associated with a degree of influence of a given user account represented by the given color coded node.

* * * * *